United States Patent
Chen et al.

(10) Patent No.: US 10,952,033 B2
(45) Date of Patent: Mar. 16, 2021

(54) MULTICAST TRANSMISSION METHOD AND APPARATUS, AND COMPUTER STORAGE MEDIUM

(71) Applicant: ZTE Corporation, Guangdong (CN)

(72) Inventors: Xianming Chen, Guangdong (CN); Bo Dai, Guangdong (CN); Jianxun Ai, Guangdong (CN); Kun Liu, Guangdong (CN); Weiwei Yang, Guangdong (CN); Huiying Fang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 141 days.

(21) Appl. No.: 16/274,159

(22) Filed: Feb. 12, 2019

(65) Prior Publication Data

US 2019/0281418 A1    Sep. 12, 2019

Related U.S. Application Data

(63) Continuation of application No. PCT/IB2016/001575, filed on Nov. 3, 2016.

(30) Foreign Application Priority Data

Aug. 12, 2016 (CN) .......................... 201610664846.4
Sep. 28, 2016 (CN) .......................... 201610859694.3

(51) Int. Cl.
*H04W 4/06* (2009.01)
*H04W 72/00* (2009.01)
(Continued)

(52) U.S. Cl.
CPC ............... *H04W 4/06* (2013.01); *H04W 4/08* (2013.01); *H04W 72/005* (2013.01);
(Continued)

(58) Field of Classification Search
CPC ....... H04W 4/06; H04W 4/08; H04W 72/005; H04W 72/042; H04W 28/0205;
(Continued)

(56) References Cited

U.S. PATENT DOCUMENTS

2014/0098761 A1* 4/2014 Lee ........................ H04W 24/02
370/329
2016/0043849 A1* 2/2016 Lee ..................... H04W 72/042
370/329

(Continued)

FOREIGN PATENT DOCUMENTS

CN          102036180 A      4/2011
CN          102882644 A      1/2013
(Continued)

OTHER PUBLICATIONS

Chinese Office Action dated Dec. 12, 2019 for Chinese Patent Application No. 201610859694.3, filed on Sep. 28, 2016 (6 pages).

(Continued)

*Primary Examiner* — Kiet Tang
(74) *Attorney, Agent, or Firm* — Perkins Coie LLP

(57) ABSTRACT

Provided are a multicast transmission method and apparatus, and a computer storage medium. The method includes: transmitting multicast channel data according to a multicast search space. The multicast search space is configured for transmitting multicast downlink control information. The multicast channel data includes at least one of multicast control channel data, multicast traffic channel data and multicast control channel change notification data.

18 Claims, 7 Drawing Sheets

(51) Int. Cl.
*H04W 72/04* (2009.01)
*H04W 4/08* (2009.01)
*H04L 12/18* (2006.01)

(52) U.S. Cl.
CPC ......... *H04W 72/042* (2013.01); *H04L 12/189* (2013.01); *Y02D 30/70* (2020.08)

(58) Field of Classification Search
CPC ......... H04W 52/0212; H04W 72/1263; H04W 72/1278; Y02D 30/70; H04L 12/189
See application file for complete search history.

(56) References Cited

U.S. PATENT DOCUMENTS

2019/0159167 A1* 5/2019 Wong .................... H04W 68/00
2019/0387501 A1* 12/2019 Park ........................ H04L 5/005

FOREIGN PATENT DOCUMENTS

| | | |
|---|---|---|
| CN | 103368716 A | 10/2013 |
| CN | 103957581 A | 7/2014 |
| CN | 105188140 A | 12/2015 |
| WO | 2013/113145 A1 | 8/2013 |
| WO | 2014/165678 A2 | 10/2014 |
| WO | 2015/137730 A1 | 9/2015 |

OTHER PUBLICATIONS

Extended Search Report dated Sep. 28, 2020 for European Application No. 16912600.0, filed on Nov. 3, 2016 (9 pages).
Interdigital, "NB-PDCCH for NB-IoT",3GPP TSG RAN WG1 NB-IoT Ad-Hoc Meeting, Sophia Antipolis, France, R1-161915, 3 pages, Mar. 2016.
International Search Report and Written Opinion dated May 11, 2017 for International Application No. PCT/IB2016/001575, filed on Nov. 3, 2016 (12 pages).

* cited by examiner

MULTICAST TRANSMISSION METHOD AND APPARATUS, AND COMPUTER STORAGE MEDIUM

CROSS REFERENCE TO RELATED APPLICATIONS

This patent document is a continuation of and claims priority to International Patent Application No. PCT/IB2016/001575, filed on Nov. 3, 2016, which claims the benefit of priority of Chinese Patent Application No. 201610664846.4, filed Aug. 12, 2016 and Chinese Patent Application No. 201610859694.3 filed Sep. 28, 2016. The entire contents of the before-mentioned patent applications are incorporated by reference as part of the disclosure of this application.

TECHNICAL FIELD

The present disclosure relates to communications and, in particular, to a multicast transmission method and apparatus, and a computer storage medium.

BACKGROUND

To meet the requirements of the Cellular Internet of Things (C-IoT), a new access system named NarrowBand-Cellular Internet of Things (NB-IoT) is proposed at the 69th plenary meeting of the Third Generation Partnership Project (3GPP). The NB-IoT system focuses on radio frequency (RF) access technologies with low complexity and low throughput, whose main research objects include an improved indoor coverage, a massive number of low-throughput user equipments, low delay sensitivity, ultra-low equipment costs, low equipment power consumption and a network architecture. The uplink and downlink transmission bandwidths of the NB-IoT system are both 180 kHz, which are the same as the bandwidth of a physical resource block (PRB) in the Long Term Evolution (LTE) system, which is advantageous for the NB-IoT system to reuse related designs of the existing LTE system. In addition, the NB-IoT system supports three different operation modes: (1) a stand-alone operation which employs such as a frequency spectrum occupied by a carrier in the Global System for Mobile Communication (GSM); (2) a guard band operation which employs such as a resource block within the guard band of an LTE carrier; (3) an in-band operation which employs such as a resource block within a practical available band of the LTE carrier.

When some terminal devices need to simultaneously receive the same information (such as firmware or software upgrade data), it is more efficient to replace unicast transmission with multicast transmission. No solution has been proposed for how to implement the multicast transmission in the NB-IoT system.

No effective solution has been proposed for the problem in the related art that the multicast transmission cannot be implemented in the NB-IoT system.

SUMMARY

In view of this, the present disclosure provides a multicast transmission method and apparatus, and a computer storage medium.

An embodiment of the present disclosure provides a multicast transmission method. The method includes the following step: multicast channel data is transmitted according to a multicast search space. The multicast search space is configured for transmitting multicast downlink control information, and the multicast channel data includes at least one of multicast control channel data, multicast traffic channel data and multicast control channel change notification data.

Optionally, the multicast search space includes a first-type multicast search space, a second-type multicast search space and a third-type multicast search space. The first-type multicast search space is configured for transmitting first-type multicast downlink control information including scheduling information of the multicast control channel data, the second-type multicast search space is configured for transmitting second-type multicast downlink control information including scheduling information of the multicast traffic channel data, and the third-type multicast search space is configured for transmitting third-type multicast downlink control information including multicast control channel change notification information. Alternatively, the multicast search space includes a fourth-type multicast search space and a fifth-type multicast search space. The fourth-type multicast search space is configured for transmitting fourth-type multicast downlink control information including scheduling information of the multicast control channel data or including the scheduling information of the multicast control channel data and multicast control channel change notification information, and the fifth-type multicast search space is configured for transmitting fifth-type multicast downlink control information including scheduling information of the multicast traffic channel data. Alternatively, the multicast search space includes a sixth-type multicast search space and a seventh-type multicast search space. The sixth-type multicast search space is configured for transmitting sixth-type multicast downlink control information including scheduling information of the multicast traffic channel data, and the seventh-type multicast search space is configured for transmitting seventh-type multicast downlink control information including multicast control channel change notification information. Alternatively, the multicast search space includes an eighth-type multicast search space. The eighth-type multicast search space is configured for transmitting eighth-type multicast downlink control information including scheduling information of the multicast traffic channel data.

Optionally, before the multicast channel data is transmitted according to the multicast search space, the method further includes the following step: the first-type multicast search space and the third-type multicast search space are configured based on first configuration information carried in a multicast system information block, and the second-type multicast search space is configured based on second configuration information carried in a multicast control channel and/or the multicast system information block; or the fourth-type multicast search space is configured based on third configuration information carried in a multicast system information block, and the fifth-type multicast search space is configured based on fourth configuration information carried in a multicast control channel and/or the multicast system information block; or the seventh-type multicast search space is configured based on fifth configuration information carried in a multicast system information block, and the sixth-type multicast search space is configured based on sixth configuration information carried in a multicast control channel and/or the multicast system information block; or the eighth-type multicast search space is configured based on seventh configuration information carried in a multicast control channel and/or a multicast system information block.

Optionally, the first configuration information and/or the second configuration information include: a narrowband of the multicast search space, a starting subframe of the multicast search space, a size of the multicast search space and/or an interval of the multicast search space. Alternatively, the third configuration information and/or the fourth configuration information include: a narrowband of the multicast search space, a starting subframe of the multicast search space, a size of the multicast search space and/or an interval of the multicast search space. Alternatively, the fifth configuration information and/or the sixth configuration information include: a narrowband of the multicast search space, a starting subframe of the multicast search space, a size of the multicast search space and/or an interval of the multicast search space. Alternatively, the seventh configuration information includes: a narrowband of the multicast search space, a starting subframe of the multicast search space, a size of the multicast search space and/or an interval of the multicast search space.

Optionally, the multicast downlink control information has a same size as unicast downlink control information or a same size as paging downlink control information or a different size from the unicast downlink control information or the paging downlink control information.

Optionally, the scheduling information of the multicast control channel data includes at least one of: a scheduling delay, resource allocation, a modulation and coding scheme, repetitions of multicast data and repetitions of downlink control information; and the scheduling information of the multicast traffic channel data includes at least one of: the scheduling delay, the resource allocation, the modulation and coding scheme, the repetitions of the multicast data, the repetitions of the downlink control information, a new data indicator and a Hybrid Automatic Repeat reQuest (HARQ) process number.

Optionally, a search space supported by the first-type multicast search space, the second-type multicast search space and/or the third-type multicast search space has a same size as a search space supported by a paging search space or a size in a subset of a set of sizes of the search space supported by the paging search space; and for a determined size of the multicast search space, a multicast candidate set in the first-type multicast search space, the second-type multicast search space or the third-type multicast search space is the same as a candidate set in the paging search space. Alternatively, a search space supported by the fourth-type multicast search space and/or the fifth-type multicast search space has a same size as a search space supported by a paging search space or a size in a subset of a set of sizes of the search space supported by the paging search space; and for a determined size of the multicast search space, a multicast candidate set in one of the fourth-type multicast search space and the fifth-type multicast search space is the same as a candidate set in the paging search space. Alternatively, a search space supported by the sixth-type multicast search space and/or the seventh-type multicast search space has a same size as a search space supported by a paging search space or a size in a subset of a set of sizes of the search space supported by the paging search space; and for a determined size of the multicast search space, a multicast candidate set in one of the sixth-type multicast search space and the seventh-type multicast search space is the same as a candidate set in the paging search space. Alternatively, a search space supported by the eighth-type multicast search space has a same size as a search space supported by a paging search space or a size in a subset of a set of sizes of the search space supported by the paging search space; and for a determined size of the multicast search space, a multicast candidate set in the eighth-type multicast search space is the same as a candidate set in the paging search space.

Optionally, the first-type multicast downlink control information is configured for dynamic scheduling or semi-persistent scheduling of the multicast control channel data; and the second-type multicast downlink control information is configured for dynamic scheduling and/or semi-persistent scheduling of the multicast traffic channel data. Alternatively, the fourth-type multicast downlink control information is configured for dynamic scheduling or semi-persistent scheduling of the multicast control channel data; and the fifth-type multicast downlink control information is configured for dynamic scheduling and/or semi-persistent scheduling of the multicast traffic channel data. Alternatively, the sixth-type multicast downlink control information is configured for dynamic scheduling and/or semi-persistent scheduling of the multicast traffic channel data. Alternatively, the eighth-type multicast downlink control information is configured for dynamic scheduling and/or semi-persistent scheduling of the multicast traffic channel data. In condition that one of the second-type multicast downlink control information, the fifth-type multicast downlink control information, the sixth-type multicast downlink control information and the eighth-type multicast downlink control information is configured for the dynamic scheduling and the semi-persistent scheduling and supports retransmission of the multicast traffic channel data, the one of the second-type multicast downlink control information, the fifth-type multicast downlink control information, the sixth-type multicast downlink control information and the eighth-type multicast downlink control information configured for the semi-persistent scheduling is merely configured for scheduling of a firstly-transmitted data packet; the one of the second-type multicast downlink control information, the fifth-type multicast downlink control information, the sixth-type multicast downlink control information and the eighth-type multicast downlink control information configured for the dynamic scheduling is merely configured for scheduling of a retransmitted data packet; or simultaneously configured for scheduling of the firstly-transmitted data packet and the retransmitted data packet.

Optionally, in condition that one of the second-type multicast downlink control information, the fifth-type multicast downlink control information, the sixth-type multicast downlink control information and the eighth-type multicast downlink control information is configured for release of the semi-persistent scheduling, at least one of the following fields: a scheduling delay, resource allocation, a modulation and coding scheme, repetitions of multicast data, a new data indicator and a HARQ process number in the one of the second-type multicast downlink control information, the fifth-type multicast downlink control information, the sixth-type multicast downlink control information and the eighth-type multicast downlink control information is reserved for use. In condition that one of the second-type multicast downlink control information, the fifth-type multicast downlink control information, the sixth-type multicast downlink control information and the eighth-type multicast downlink control information is configured for activation of the semi-persistent scheduling, at least the new data indicator and the HARQ process number in the one of the second-type multicast downlink control information, the fifth-type multicast downlink control information, the sixth-type multicast downlink control information and the eighth-type multicast downlink control information are reserved for use.

Optionally, in condition that one of the second-type multicast downlink control information, the fifth-type multicast downlink control information, the sixth-type multicast downlink control information and the eighth-type multicast downlink control information is configured for the dynamic scheduling and the semi-persistent scheduling of the multicast traffic channel data, the method further includes one of the steps described below. The second-type multicast search space in which the second-type multicast downlink control information configured for the semi-persistent scheduling is allowed to be detected is predefined; or the fifth-type multicast search space in which the fifth-type multicast downlink control information configured for the semi-persistent scheduling is allowed to be detected is predefined; or the sixth-type multicast search space in which the sixth-type multicast downlink control information configured for the semi-persistent scheduling is allowed to be detected is predefined; or the eighth-type multicast search space in which the eighth-type multicast downlink control information configured for the semi-persistent scheduling is allowed to be detected is predefined. The second-type multicast search space in which the second-type multicast downlink control information configured for the semi-persistent scheduling is allowed to be detected is indicated through a multicast control channel; or the fifth-type multicast search space in which the fifth-type multicast downlink control information configured for the semi-persistent scheduling is allowed to be detected is indicated through a multicast control channel; or the sixth-type multicast search space in which the sixth-type multicast downlink control information configured for the semi-persistent scheduling is allowed to be detected is indicated through a multicast control channel; or the eighth-type multicast search space in which the eighth-type multicast downlink control information configured for the semi-persistent scheduling is allowed to be detected is indicated through a multicast control channel.

Optionally, the method further includes one of the steps described below. In the second-type multicast search space in which the second-type multicast downlink control information configured for the semi-persistent scheduling is allowed to be detected, a terminal device simultaneously detects the second-type multicast downlink control information configured for the dynamic scheduling and the second-type multicast downlink control information configured for the semi-persistent scheduling, where when one of the second-type multicast downlink control information configured for the dynamic scheduling and the second-type multicast downlink control information configured for the semi-persistent scheduling is successfully detected, the terminal device stops detecting the other of the second-type multicast downlink control information configured for the dynamic scheduling and the second-type multicast downlink control information configured for the semi-persistent scheduling. In the fifth-type multicast search space in which the fifth-type multicast downlink control information configured for the semi-persistent scheduling is allowed to be detected, the terminal device simultaneously detects the fifth-type multicast downlink control information configured for the dynamic scheduling and the fifth-type multicast downlink control information configured for the semi-persistent scheduling, where when one of the fifth-type multicast downlink control information configured for the dynamic scheduling and the fifth-type multicast downlink control information configured for the semi-persistent scheduling is successfully detected, the terminal device stops detecting the other of the fifth-type multicast downlink control information configured for the dynamic scheduling and the fifth-type multicast downlink control information configured for the semi-persistent scheduling. In the sixth-type multicast search space in which the sixth-type multicast downlink control information configured for the semi-persistent scheduling is allowed to be detected, the terminal device simultaneously detects the sixth-type multicast downlink control information configured for the dynamic scheduling and the sixth-type multicast downlink control information configured for the semi-persistent scheduling, where when one of the sixth-type multicast downlink control information configured for the dynamic scheduling and the sixth-type multicast downlink control information configured for the semi-persistent scheduling is successfully detected, the terminal device stops detecting the other of the sixth-type multicast downlink control information configured for the dynamic scheduling and the sixth-type multicast downlink control information configured for the semi-persistent scheduling. In the eighth-type multicast search space in which the eighth-type multicast downlink control information configured for the semi-persistent scheduling is allowed to be detected, the terminal device simultaneously detects the eighth-type multicast downlink control information configured for the dynamic scheduling and the eighth-type multicast downlink control information configured for the semi-persistent scheduling, where when one of the eighth-type multicast downlink control information configured for the dynamic scheduling and the eighth-type multicast downlink control information configured for the semi-persistent scheduling is successfully detected, the terminal device stops detecting the other of the eighth-type multicast downlink control information configured for the dynamic scheduling and the eighth-type multicast downlink control information configured for the semi-persistent scheduling.

Optionally, the method further includes one of the steps described below. A radio network temporal identity for identifying the second-type multicast downlink control information is indicated through a multicast control channel or predefined. A radio network temporal identity for identifying the fifth-type multicast downlink control information is indicated through a multicast control channel or predefined. A radio network temporal identity for identifying the sixth-type multicast downlink control information is indicated through a multicast control channel or predefined. A radio network temporal identity for identifying the eighth-type multicast downlink control information is indicated through a multicast control channel or predefined.

Optionally, in condition that the second-type multicast downlink control information is configured for the dynamic scheduling and the semi-persistent scheduling of the multicast traffic channel data, the second-type multicast downlink control information configured for the dynamic scheduling and the second-type multicast downlink control information configured for the semi-persistent scheduling have different radio network temporal identities. In condition that the fifth-type multicast downlink control information is configured for the dynamic scheduling and the semi-persistent scheduling of the multicast traffic channel data, the fifth-type multicast downlink control information configured for the dynamic scheduling and the fifth-type multicast downlink control information configured for the semi-persistent scheduling have different radio network temporal identities. When the sixth-type multicast downlink control information is configured for the dynamic scheduling and the semi-persistent scheduling of the multicast traffic channel data, the sixth-type multicast downlink control information configured for the dynamic scheduling and the sixth-type multicast downlink control information configured for the semi-persistent scheduling have different radio network temporal identities. In condition that the eighth-type multicast downlink control information is configured for the dynamic scheduling and the semi-persistent scheduling of the multicast traffic channel data, the eighth-type multicast downlink control information configured for the dynamic scheduling and the eighth-type multicast downlink control information configured for the semi-persistent scheduling have different radio network temporal identities.

Optionally, when a terminal device is in a connected state and the multicast search space overlaps with a unicast search space, the method further includes the following step: the terminal device receives the multicast search space and the unicast search space in one of the manners described below. Merely the unicast search space is received and the multicast search space is abandoned to be received. Merely the multicast search space is received and the unicast search space is abandoned to be received. Merely one of the unicast search space and the multicast search space, which appears earlier than the other of the unicast search space and the multicast search space, is received. The multicast search space is preferentially received, and when a first preset condition is met, the terminal device is allowed to continue to receive the unicast search space after the terminal device receives the multicast search space, and when a first preset condition is not met, the unicast search space is abandoned to be received, where the first preset condition includes the following: the multicast search space is located before the unicast search space; the terminal device receives the multicast search space based on a specified candidate set of the multicast search space, wherein the specified candidate set of the multicast search space does not overlap with the unicast search space; and the terminal device has not successfully detected the multicast downlink control information, or has successfully detected one of the third-type multicast downlink control information and the seventh-type multicast downlink control information and determined that a practical candidate set for transmitting one of the third-type multicast downlink control information and the seventh-type multicast downlink control information does not overlap the unicast search space.

Optionally, in condition that a terminal device is in an idle state and the multicast search space overlaps with a paging search space, the method further includes the following step: the terminal device receives the multicast search space and the paging search space by one of the manners described below. Merely the paging search space is received and the multicast search space is abandoned to be received. Merely the multicast search space is received and the paging search space is abandoned to be received. Merely one of the paging search space and the multicast search space, which appears earlier or later than the other of the paging search space and the multicast search space, is received. The multicast search space is preferentially received, and when a second preset condition is met, the terminal device is allowed to continue to receive the paging search space after the terminal device receives the multicast search space, and when the second preset condition is not met, the paging search space is abandoned to be received; where the second preset condition includes the following: the multicast search space is located before the paging search space; the terminal device receives the multicast search space based on a specified candidate set of the multicast search space, where the specified candidate set of the multicast search space does not overlap with the paging search space; and the terminal device has not successfully detected the multicast downlink control information, or has successfully detected one of the third-type multicast downlink control information and the seventh-type multicast downlink control information and determined that a practical candidate set for transmitting one of the third-type multicast downlink control information and the seventh-type multicast downlink control information does not overlap with the paging search space. One of the paging search space and the multicast search space, which appears first, is preferentially received. When the multicast search space appears first and a third preset condition is met, the terminal device is allowed to continue to receive the paging search space after receiving the multicast search space, or otherwise the paging search space is abandoned to be received; where the third preset condition includes the following: the terminal device receives the multicast search space based on the specified candidate set of the multicast search space, where the specified candidate set does not overlap with the paging search space; and the terminal device has not successfully detected the multicast downlink control information, or has successfully detected one of the third-type multicast downlink control information and the seventh-type multicast downlink control information and determined that the practical candidate set for transmitting one of the third-type multicast downlink control information and the seventh-type multicast downlink control information does not overlap the paging search space. Alternatively, when the paging search space appears first and a fourth preset condition is met, the terminal device is allowed to continue to receive the multicast search space after receiving the paging search space, or otherwise the multicast search space is abandoned to be received, where the fourth preset condition includes the following: the terminal device receives the paging search space based on a specified candidate set of the paging search space, where the specified candidate set does not overlap with the multicast search space; and the terminal device has not successfully detected paging downlink control information, or successfully detected the paging downlink control information merely configured for a system information change notification purpose and determined that a practical candidate set for transmitting the paging downlink control information merely configured for the system information change notification purpose does not overlap with the multicast search space.

Optionally, in condition that a terminal device is in a connected state, the method further includes the following step: the terminal device detects unicast downlink control information within the multicast search space.

Optionally, the step in which the terminal device detects the unicast downlink control information within the multicast search space includes one of the following steps: the terminal device detects the unicast downlink control information according to a multicast candidate set; the terminal device detects the unicast downlink control information according to a candidate set in a unicast search space from a starting time of the multicast search space; and the terminal device detects the unicast downlink control information according to a candidate set using a specified aggregation level in the candidate set in the unicast search space from the starting time of the multicast search space.

Optionally, in condition that the terminal device detects the unicast downlink control information according to the multicast candidate set, the unicast downlink control information has a same size as the multicast downlink control information in the multicast search space.

Optionally, in a case where merely the multicast search space is received and a unicast search space is abandoned to be received, in condition that the multicast search space completely covers the unicast search space in time domain, the terminal device detects unicast downlink control information based on a resource of the multicast search space from a starting time of the unicast search space; where the unicast downlink control information is detected according to a candidate set in the unicast search space or a candidate set using a specified aggregation level in the candidate set in the unicast search space.

Optionally, in condition that the multicast downlink control information supports frequency hopping, configuration of paging downlink control information is reused by at least one of the following parameters: a frequency hopping enable flag, a number of frequency hopping narrowbands, a frequency hopping interval and a frequency hopping offset.

Optionally, in condition that the multicast search space includes two types of multicast search spaces and the fourth-type multicast downlink control information does not include the multicast control channel change notification information, or the multicast search space includes one type of multicast search space, the terminal device acquires the multicast control channel change notification information using a master information block, a multicast system information block, paging downlink control information or a RNTI.

Optionally, for a terminal device having a receiving capability within a first bandwidth, a maximum bandwidth for receiving supported by the multicast traffic channel data includes one of the following: a first bandwidth, a second bandwidth, and the first bandwidth or the second bandwidth determined via signaling; where the first bandwidth is greater than the second bandwidth.

Optionally, in condition that the multicast channel data is the multicast traffic channel data, after a terminal device receives at least one multicast traffic channel data packet, the terminal device feeds back non-acknowledgement (NACK) information to a network side in responding to unsuccessfully decoding all of the at least one multicast traffic channel data packet.

Optionally, a transmission starting time of a signal for carrying the NACK information is predefined or configured through a multicast control channel and/or the multicast downlink control information.

Optionally, a transmission duration of a signal for carrying the NACK information is predefined, or configured through a multicast control channel and/or the multicast downlink control information, or determined according to a current coverage level of the terminal device, or determined according to a maximum number of transmission repetitions in numbers of transmission repetitions used by the terminal device to successfully decode the multicast downlink control information.

Optionally, a signal for carrying the NACK information has a preamble format.

Another embodiment of the present disclosure provides a multicast transmission apparatus, including a transmission module. The transmission module is configured to transmit multicast channel data according to a multicast search space. The multicast search space is configured for transmitting multicast downlink control information, and the multicast channel data includes at least one of multicast control channel data, multicast traffic channel data and multicast control channel change notification data.

Optionally, the multicast search space includes a first-type multicast search space, a second-type multicast search space and a third-type multicast search space. The first-type multicast search space is configured for transmitting first-type multicast downlink control information including scheduling information of the multicast control channel data, the second-type multicast search space is configured for transmitting second-type multicast downlink control information including scheduling information of the multicast traffic channel data, and the third-type multicast search space is configured for transmitting third-type multicast downlink control information including multicast control channel change notification information. Alternatively, the multicast search space includes a fourth-type multicast search space and a fifth-type multicast search space. The fourth-type multicast search space is configured for transmitting fourth-type multicast downlink control information including scheduling information of the multicast control channel data or including the scheduling information of the multicast control channel data and multicast control channel change notification information, and the fifth-type multicast search space is configured for transmitting fifth-type multicast downlink control information including scheduling information of the multicast traffic channel data. Alternatively, the multicast search space includes a sixth-type multicast search space and a seventh-type multicast search space. The sixth-type multicast search space is configured for transmitting sixth-type multicast downlink control information including scheduling information of the multicast traffic channel data, and the seventh-type multicast search space is configured for transmitting seventh-type multicast downlink control information including multicast control channel change notification information. Alternatively, the multicast search space includes an eighth-type multicast search space. The eighth-type multicast search space is configured for transmitting eighth-type multicast downlink control information including scheduling information of the multicast traffic channel data.

Optionally, the apparatus further includes a first configuration module or a second configuration module or a third configuration module or a fourth configuration module. The first configuration module is configured to configure the first-type multicast search space and the third-type multicast search space based on first configuration information carried in a multicast system information block, and configure the second-type multicast search space based on second configuration information carried in a multicast control channel and/or the multicast system information block. The second configuration module is configured to configure the fourth-type multicast search space based on third configuration information carried in a multicast system information block, and configure the fifth-type multicast search space based on fourth configuration information carried in a multicast control channel and/or the multicast system information block. The third configuration module is configured to configure the seventh-type multicast search space based on fifth configuration information carried in a multicast system information block, and configure the sixth-type multicast search space based on sixth configuration information carried in a multicast control channel and/or the multicast system information block. The fourth configuration module is configured to configure the eighth-type multicast search space based on seventh configuration information carried in a multicast control channel and/or a multicast system information block.

Optionally, the first configuration information and/or the second configuration information include: a narrowband of the multicast search space, a starting subframe of the multicast search space, a size of the multicast search space and/or an interval of the multicast search space. Alternatively, the third configuration information and/or the fourth configuration information include: a narrowband of the multicast search space, a starting subframe of the multicast search space, a size of the multicast search space and/or an interval of the multicast search space. Alternatively, the fifth configuration information and/or the sixth configuration information include: a narrowband of the multicast search space, a starting subframe of the multicast search space, a size of the multicast search space and/or an interval of the multicast search space. Alternatively, the seventh configuration information includes: a narrowband of the multicast search space, a starting subframe of the multicast search space, a size of the multicast search space and/or an interval of the multicast search space.

Optionally, the multicast downlink control information has a same size as unicast downlink control information or a same size as paging downlink control information or a different size from the unicast downlink control information or the paging downlink control information.

Optionally, the scheduling information of the multicast control channel data includes at least one of: a scheduling delay, resource allocation, a modulation and coding scheme, repetitions of multicast data and repetitions of downlink control information; and the scheduling information of the multicast traffic channel data includes at least one of: the scheduling delay, the resource allocation, the modulation and coding scheme, the repetitions of the multicast data, the repetitions of the downlink control information, a new data indicator and a HARQ process number.

Optionally, a search space supported by the first-type multicast search space, the second-type multicast search space and/or the third-type multicast search space has a same size as a search space supported by a paging search space or a size in a subset of a set of sizes of the search space supported by the paging search space; and for a determined size of the multicast search space, a multicast candidate set in one of the first-type multicast search space, the second-type multicast search space and the third-type multicast search space is the same as a candidate set in the paging search space. Alternatively, a search space supported by the fourth-type multicast search space and/or the fifth-type multicast search space has a same size as a search space supported by a paging search space or a size in a subset of a set of sizes of the search space supported by the paging search space; and for a determined size of the multicast search space, a multicast candidate set in one of the fourth-type multicast search space and the fifth-type multicast search space is the same as a candidate set in the paging search space. Alternatively, a search space supported by the sixth-type multicast search space and/or the seventh-type multicast search space has a same size as a search space supported by a paging search space or a size in a subset of a set of sizes of the search space supported by the paging search space; and for a determined size of the multicast search space, a multicast candidate set in the sixth-type multicast search space or the seventh-type multicast search space is the same as a candidate set in the paging search space. Alternatively, a search space supported by the eighth-type multicast search space has a same size as a search space supported by a paging search space or a size in a subset of a set of sizes of the search space supported by the paging search space; and for a determined size of the multicast search space, a multicast candidate set in the eighth-type multicast search space is the same as a candidate set in the paging search space.

Optionally, the first-type multicast downlink control information is configured for dynamic scheduling or semi-persistent scheduling of the multicast control channel data, and the second-type multicast downlink control information is configured for dynamic scheduling and/or semi-persistent scheduling of the multicast traffic channel data. Alternatively, the fourth-type multicast downlink control information is configured for dynamic scheduling or semi-persistent scheduling of the multicast control channel data, and the fifth-type multicast downlink control information is configured for dynamic scheduling and/or semi-persistent scheduling of the multicast traffic channel data. Alternatively, the sixth-type multicast downlink control information is configured for dynamic scheduling and/or semi-persistent scheduling of the multicast traffic channel data. Alternatively, the eighth-type multicast downlink control information is configured for dynamic scheduling and/or semi-persistent scheduling of the multicast traffic channel data. In condition that one of the second-type multicast downlink control information, the fifth-type multicast downlink control information, the sixth-type multicast downlink control information and the eighth-type multicast downlink control information is configured for the dynamic scheduling and the semi-persistent scheduling and supports retransmission of the multicast traffic channel data, the one of the second-type multicast downlink control information, the fifth-type multicast downlink control information, the sixth-type multicast downlink control information and the eighth-type multicast downlink control information configured for the semi-persistent scheduling is merely configured for scheduling of a firstly-transmitted data packet; the one of the second-type multicast downlink control information, the fifth-type multicast downlink control information, the sixth-type multicast downlink control information and the eighth-type multicast downlink control information configured for the dynamic scheduling is merely configured for scheduling of a retransmitted data packet; or simultaneously configured for scheduling of the firstly-transmitted data packet and the retransmitted data packet.

Optionally, in condition that one of the second-type multicast downlink control information, the fifth-type multicast downlink control information, the sixth-type multicast downlink control information and the eighth-type multicast downlink control information is configured for release of the semi-persistent scheduling, at least one of the following fields: a scheduling delay, resource allocation, a modulation and coding scheme, repetitions of multicast data, a new data indicator and a HARQ process number in the one of the second-type multicast downlink control information, the fifth-type multicast downlink control information, the sixth-type multicast downlink control information and the eighth-type multicast downlink control information is reserved for use. In condition that one of the second-type multicast downlink control information, the fifth-type multicast downlink control information, the sixth-type multicast downlink control information and the eighth-type multicast downlink control information is configured for activation of the semi-persistent scheduling, at least the new data indicator and the HARQ process number in the one of the second-type multicast downlink control information, the fifth-type multicast downlink control information, the sixth-type multicast downlink control information and the eighth-type multicast downlink control information are reserved for use.

Optionally, the apparatus further includes one of a pre-definition module and an indication module. The predefinition module is configured to, in condition that one of the second-type multicast downlink control information and the fifth-type multicast downlink control information is configured for the dynamic scheduling and the semi-persistent scheduling of the multicast traffic channel data, predefine one of the following: the second-type multicast search space in which the second-type multicast downlink control information configured for the semi-persistent scheduling is allowed to be detected; the fifth-type multicast search space in which the fifth-type multicast downlink control information configured for the semi-persistent scheduling is allowed to be detected; the sixth-type multicast search space in which the sixth-type multicast downlink control information configured for the semi-persistent scheduling is allowed to be detected; and the eighth-type multicast search space in which the eighth-type multicast downlink control information configured for the semi-persistent scheduling is allowed to be detected. The indication module is configured to, in condition that one of the second-type multicast downlink control information and the fifth-type multicast downlink control information is configured for the dynamic scheduling and the semi-persistent scheduling of the multicast traffic channel data, indicate, through a multicast control channel, one of the following: the second-type multicast search space in which the second-type multicast downlink control information configured for the semi-persistent scheduling is allowed to be detected; the fifth-type multicast search space in which the fifth-type multicast downlink control information configured for the semi-persistent scheduling is allowed to be detected; the sixth-type multicast search space in which the sixth-type multicast downlink control information configured for the semi-persistent scheduling is allowed to be detected; and the eighth-type multicast search space in which the eighth-type multicast downlink control information configured for the semi-persistent scheduling is allowed to be detected.

Optionally, the apparatus is applied to a terminal device and the apparatus further includes one of a first detection module, a second detection module, a fourth detection module and a fifth detection module. The first detection module is configured to, in the second-type multicast search space in which the second-type multicast downlink control information configured for the semi-persistent scheduling is allowed to be detected, simultaneously detect the second-type multicast downlink control information configured for the dynamic scheduling and the second-type multicast downlink control information configured for the semi-persistent scheduling, where when one of the second-type multicast downlink control information configured for the dynamic scheduling and the second-type multicast downlink control information configured for the semi-persistent scheduling is successfully detected, the first detection module stops detecting the other of the second-type multicast downlink control information configured for the dynamic scheduling and the second-type multicast downlink control information configured for the semi-persistent scheduling. The second detection module is configured to, in the fifth-type multicast search space in which the fifth-type multicast downlink control information configured for the semi-persistent scheduling is allowed to be detected, simultaneously detect the fifth-type multicast downlink control information configured for the dynamic scheduling and the fifth-type multicast downlink control information configured for the semi-persistent scheduling, where when one of the fifth-type multicast downlink control information configured for the dynamic scheduling and the fifth-type multicast downlink control information configured for the semi-persistent scheduling is successfully detected, the second detection module stops detecting the other of the fifth-type multicast downlink control information configured for the dynamic scheduling and the fifth-type multicast downlink control information configured for the semi-persistent scheduling. The fourth detection module is configured to, in the sixth-type multicast search space in which the sixth-type multicast downlink control information configured for the semi-persistent scheduling is allowed to be detected, simultaneously detect the sixth-type multicast downlink control information configured for the dynamic scheduling and the sixth-type multicast downlink control information configured for the semi-persistent scheduling, where when one of the sixth-type multicast downlink control information configured for the dynamic scheduling and the sixth-type multicast downlink control information configured for the semi-persistent scheduling is successfully detected, the fourth detection module stops detecting the other of the sixth-type multicast downlink control information configured for the dynamic scheduling and the sixth-type multicast downlink control information configured for the semi-persistent scheduling. The fifth detection module is configured to, in the eighth-type multicast search space in which the eighth-type multicast downlink control information configured for the semi-persistent scheduling is allowed to be detected, simultaneously detect the eighth-type multicast downlink control information configured for the dynamic scheduling and the eighth-type multicast downlink control information configured for the semi-persistent scheduling, where when one of the eighth-type multicast downlink control information configured for the dynamic scheduling and the eighth-type multicast downlink control information configured for the semi-persistent scheduling is successfully detected, the fifth detection module stops detecting the other of the eighth-type multicast downlink control information configured for the dynamic scheduling and the eighth-type multicast downlink control information configured for the semi-persistent scheduling.

Optionally, the apparatus further includes one of a first processing module, a second processing module, a third processing module and a fourth processing module. The first processing module is configured to indicate through a multicast control channel or predefine a RNTI for identifying the second-type multicast downlink control information. The second processing module is configured to indicate through a multicast control channel or predefine a radio network temporal identity for identifying the fifth-type multicast downlink control information. The third processing module is configured to indicate through a multicast control channel or predefine a radio network temporal identity for identifying the sixth-type multicast downlink control information. The fourth processing module is configured to indicate through a multicast control channel or predefine a radio network temporal identity for identifying the eighth-type multicast downlink control information.

Optionally, in condition that the second-type multicast downlink control information is configured for the dynamic scheduling and the semi-persistent scheduling of the multicast traffic channel data, the second-type multicast downlink control information configured for the dynamic scheduling and the second-type multicast downlink control information configured for the semi-persistent scheduling have different radio network temporal identities. In condition that the fifth-type multicast downlink control information is configured for the dynamic scheduling and the semi-persistent scheduling of the multicast traffic channel data, the fifth-type multicast downlink control information configured for the dynamic scheduling and the fifth-type multicast downlink control information configured for the semi-persistent scheduling have different radio network temporal identities. In condition that the sixth-type multicast downlink control information is configured for the dynamic scheduling and the semi-persistent scheduling of the multicast traffic channel data, the sixth-type multicast downlink control information configured for the dynamic scheduling and the sixth-type multicast downlink control information configured for the semi-persistent scheduling have different radio network temporal identities. In condition that the eighth-type multicast downlink control information is configured for the dynamic scheduling and the semi-persistent scheduling of the multicast traffic channel data, the eighth-type multicast downlink control information configured for the dynamic scheduling and the eighth-type multicast downlink control information configured for the semi-persistent scheduling have different radio network temporal identities.

Optionally, the apparatus is applied to a terminal device and the apparatus further includes a first receiving module. The first receiving module is configured to, in condition that the terminal device is in a connected state and the multicast search space overlaps with a unicast search space, receive the multicast search space and the unicast search space by one of the manners described below. Merely the unicast search space is received and the multicast search space is abandoned to be received. Merely the multicast search space is received and the unicast search space is abandoned to be received. Merely one of the unicast search space and the multicast search space, which appears earlier or later than the other of the unicast search space and the multicast search space, is received. The multicast search space is preferentially received, and when a first preset condition is met, the terminal device is allowed to continue to receive the unicast search space after terminal device receives the multicast search space, and when the first preset condition is not met, the unicast search space is abandoned to be received, where the first preset condition includes the following: the multicast search space is located before the unicast search space; the terminal device receives the multicast search space based on a specified candidate set of the multicast search space, where the specified candidate set of the multicast search space does not overlap with the unicast search space; and the terminal device has not successfully detected the multicast downlink control information, or has successfully detected one of the third-type multicast downlink control information and the seventh-type multicast downlink control information and determined that a practical candidate set for transmitting one of the third-type multicast downlink control information and the seventh-type multicast downlink control information does not overlap with the unicast search space.

Optionally, the apparatus is applied to a terminal device and the apparatus further includes a second receiving module. The second receiving module is configured to, in condition that the terminal device is in an idle state and the multicast search space overlaps with a paging search space, receive the multicast search space and the paging search space by one of the manners described below. Merely the paging search space is received and the multicast search space is abandoned to be received. Merely the multicast search space is received and the paging search space is abandoned to be received. Merely one of the paging search space and the multicast search space, which appears earlier or later than the other of the paging search space and the multicast search space, is received. The multicast search space is preferentially received, and when a second preset condition is met, the terminal device is allowed to continue to receive the paging search space after the terminal device receives the multicast search space, and the second preset condition is not met, the paging search space is abandoned to be received, where the second preset condition includes the following: the multicast search space is located before the paging search space; the terminal device receives the multicast search space based on a specified candidate set of the multicast search space, where the specified candidate set of the multicast search space does not overlap with the paging search space; and the terminal device has not successfully detected the multicast downlink control information, or has successfully detected one of the third-type multicast downlink control information and the seventh-type multicast downlink control information and determined that a practical candidate set for transmitting one of the third-type multicast downlink control information and the seventh-type multicast downlink control information does not overlap with the paging search space. One of the paging search space and the multicast search space, which appears first, is preferentially received. When the multicast search space appears and a third preset condition is met, the terminal device is allowed to continue to receive the paging search space after receiving the multicast search space, or otherwise the paging search space is abandoned to be received, where the third preset condition includes the following: the terminal device receives the multicast search space based on the specified candidate set of the multicast search space, where the specified candidate set does not overlap with the paging search space; and the terminal device has not successfully detected the multicast downlink control information, or has successfully detected one of the third-type multicast downlink control information and the seventh-type multicast downlink control information and determined that the practical candidate set for transmitting one of the third-type multicast downlink control information and the seventh-type multicast downlink control information does not overlap with the paging search space. Alternatively, when the paging search space appears first, the terminal device is allowed to continue to receive the multicast search space after receiving the paging search space, or otherwise the multicast search space is abandoned to be received; where the fourth preset condition includes the following: the terminal device receives the paging search space based on a specified candidate set of the paging search space, where the specified candidate set does not overlap with the multicast search space; and the terminal device has not successfully detected paging downlink control information, or successfully detected the paging downlink control information merely configured for a system information change notification purpose and determined that a practical candidate set for transmitting the paging downlink control information merely configured for the system information change notification purpose does not overlap with the multicast search space.

Optionally, the apparatus is applied to a terminal device and the apparatus further includes a third detection module. The third detection module is configured to, in condition that the terminal device is in a connected state, detect unicast downlink control information within the multicast search space.

Optionally, the apparatus is applied to the terminal device and the third detection module is configured to perform one of the following operations: the unicast downlink control information is detected according to a multicast candidate set; the unicast downlink control information is detected according to a candidate set in a unicast search space from a starting time of the multicast search space; and the unicast downlink control information is detected according to a candidate set using a specified aggregation level in the candidate set in the unicast search space from the starting time of the multicast search space.

Optionally, in condition that the terminal device detects the unicast downlink control information according to the multicast candidate set, the unicast downlink control information has a same size as the multicast downlink control information in the multicast search space.

Optionally, in a case where merely the multicast search space is received and a unicast search space is abandoned to be received, in condition that the multicast search space completely covers the unicast search space in time domain, the terminal device detects unicast downlink control information based on a resource of the multicast search space from a starting time of the unicast search space, where the unicast downlink control information is detected according to a candidate set in the unicast search space or a candidate set using a specified aggregation level in the candidate set in the unicast search space.

Optionally, in condition that the multicast downlink control information supports frequency hopping, configuration of paging downlink control information is reused by at least one of the following parameters: a frequency hopping enable flag, a number of frequency hopping narrowbands, a frequency hopping interval and a frequency hopping offset.

Optionally, in condition that the multicast search space includes two types of multicast search spaces and the fourth-type multicast downlink control information does not include the multicast control channel change notification information, or when the multicast search space includes one type of multicast search space, the terminal device acquires the multicast control channel change notification information using a master information block, a multicast system information block, paging downlink control information or a RNTI.

Optionally, for a terminal device having a receiving capability within a first bandwidth, a maximum bandwidth for receiving supported by the multicast traffic channel data includes one of the following: a first bandwidth, a second bandwidth, and the first bandwidth or the second bandwidth determined via signaling; where the first bandwidth is greater than the second bandwidth.

Optionally, in condition that the multicast channel data is the multicast traffic channel data, after a terminal device receives at least one multicast traffic channel data packet, the terminal device feeds back NACK information to a network side in responding to unsuccessfully decoding all of the at least one multicast traffic channel data packet.

Optionally, a transmission starting time of a signal for carrying the NACK information is predefined or configured through a multicast control channel and/or the multicast downlink control information.

Optionally, a transmission duration of a signal for carrying the NACK information is predefined, or configured through a multicast control channel and/or the multicast downlink control information, or determined according to a current coverage level of the terminal device, or determined according to a maximum number of transmission repetitions in numbers of transmission repetitions used by the terminal device to successfully decode the multicast downlink control information.

Optionally, a signal for carrying the NACK information has a preamble format.

Yet another embodiment of the present disclosure provides a computer storage medium, including a set of instructions, where when the set of instructions are executed, at least one processor is caused to execute the multicast transmission method described above.

In the embodiments of the present disclosure, the multicast channel data is transmitted according to the multicast search space. The multicast search space is configured for transmitting the multicast downlink control information, and the multicast channel data includes at least one of the multicast control channel data, the multicast traffic channel data and the multicast control channel change notification data. It can be seen that the above solutions are configured for transmitting the multicast channel data such as the multicast control channel data, the multicast traffic channel data and the multicast control channel change notification data according to the multicast search space for transmitting the multicast downlink control information to implement data transmission in a multicast manner in the NB-IoT system, thereby solving the problem in the related art that multicast transmission cannot be implemented in the NB-IoT system.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

Figure 1:
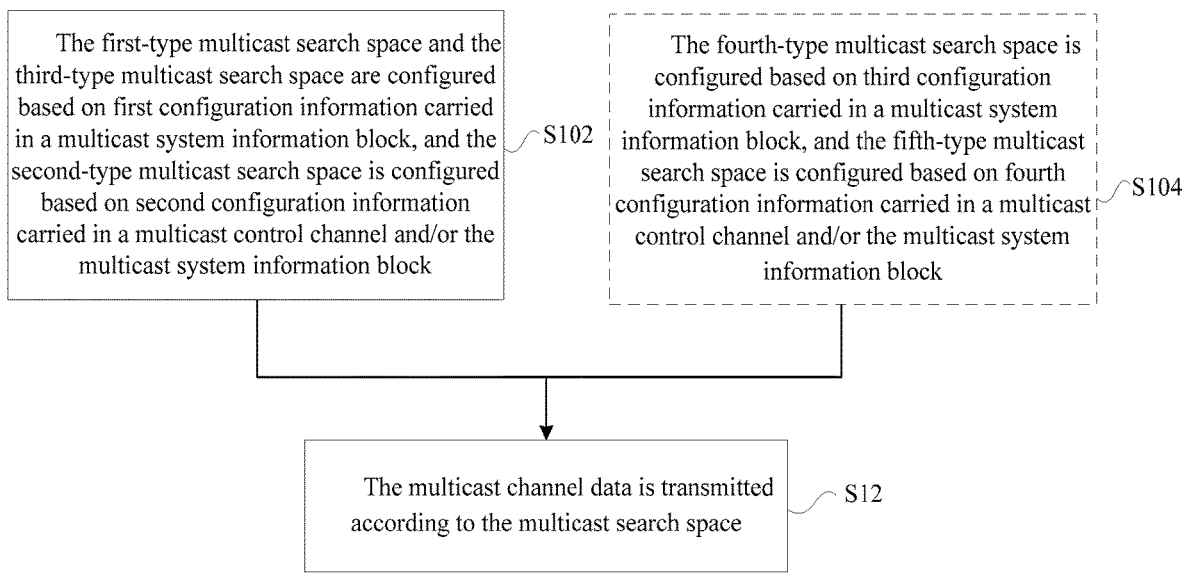
FIG. 1 is a flowchart of a multicast transmission method according to an embodiment of the present disclosure.

Hereinafter the present disclosure will be described in detail with reference to the drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

A multicast transmission method is provided in the embodiment. The method includes the step described below.

In step S12, multicast channel data is transmitted according to a multicast search space.

The multicast search space is configured for transmitting multicast downlink control information, and the multicast channel data includes at least one of multicast control channel data, multicast traffic channel data and multicast control channel change notification data.

Optionally, the multicast transmission method may, but may not necessarily, be applied to a data transmission scenario in an NB-IoT system, for example, multicast transmission of data in the NB-IoT system.

Optionally, the multicast transmission method may, but may not necessarily, be applied to a base station such as a macro base station, a micro base station, a pico base station and a home base station. The multicast transmission method may further, but may not necessarily, be applied to a terminal such as a mobile phone, a PC, a notebook computer, a tablet computer, a smart wearable device and a smart home device.

In the above step, the multicast channel data is transmitted according to the multicast search space. The multicast search space is configured for transmitting the multicast downlink control information, and the multicast channel data includes at least one of the multicast control channel data, the multicast traffic channel data and the multicast control channel change notification data. It can be seen that the above solution is configured for transmitting the multicast channel data such as the multicast control channel data, the multicast traffic channel data and the multicast control channel change notification data according to the multicast search space for transmitting the multicast downlink control information to implement data transmission in a multicast manner in the NB-IoT system, thereby solving the problem in the related art that multicast transmission cannot be implemented in the NB-IoT system.

Optionally, the multicast search space may include, but is not limited to, a first-type multicast search space, a second-type multicast search space and a third-type multicast search space. The first-type multicast search space is configured for transmitting first-type multicast downlink control information including scheduling information of the multicast control channel data, the second-type multicast search space is configured for transmitting second-type multicast downlink control information including scheduling information of the multicast traffic channel data, and the third-type multicast search space is configured for transmitting third-type multicast downlink control information including multicast control channel change notification information.

Alternatively, the multicast search space may include, but is not limited to, a fourth-type multicast search space and a fifth-type multicast search space. The fourth-type multicast search space is configured for transmitting fourth-type multicast downlink control information including scheduling information of the multicast control channel data or including the scheduling information of the multicast control channel data and multicast control channel change notification information, and the fifth-type multicast search space is configured for transmitting fifth-type multicast downlink control information including scheduling information of the multicast traffic channel data.

Alternatively, the multicast search space may include, but is not limited to, a sixth-type multicast search space and a seventh-type multicast search space. The sixth-type multicast search space is configured for transmitting sixth-type multicast downlink control information including scheduling information of the multicast traffic channel data, and the seventh-type multicast search space is configured for transmitting seventh-type multicast downlink control information including multicast control channel change notification information.

Alternatively, the multicast search space may include, but is not limited to, an eighth-type multicast search space. The eighth-type multicast search space is configured for transmitting eighth-type multicast downlink control information including scheduling information of the multicast traffic channel data.

FIG. 1 is a flowchart of a multicast transmission method according to an embodiment of the present disclosure. As shown in FIG. 1, optionally, the process of the method includes steps described below.

In step S102, the first-type multicast search space and the third-type multicast search space are configured based on first configuration information carried in a multicast system information block, and the second-type multicast search space is configured based on second configuration information carried in a multicast control channel and/or the multicast system information block.

Alternatively, in step S104, the fourth-type multicast search space is configured based on third configuration information carried in a multicast system information block, and the fifth-type multicast search space is configured based on fourth configuration information carried in a multicast control channel and/or the multicast system information block.

In step S12, the multicast channel data is transmitted according to the multicast search space. The multicast search space is configured for transmitting the multicast downlink control information, and the multicast channel data includes at least one of the multicast control channel data, the multicast traffic channel data and the multicast control channel change notification data.

Optionally, in the above process, the multicast search space may be configured in one of the manners described below.

In a manner 1, the seventh-type multicast search space is configured based on fifth configuration information carried in a multicast system information block, and the sixth-type multicast search space is configured based on sixth configuration information carried in a multicast control channel and/or the multicast system information block.

In a manner 2, the eighth-type multicast search space is configured based on seventh configuration information carried in a multicast control channel and/or a multicast system information block.

In the above steps, before the multicast channel data is transmitted according to the multicast search space, different configuration information is employed to configure different types of multicast search spaces, thereby solving the problem in the related art that the multicast transmission cannot be implemented in the NB-IoT system and implementing data transmission in the multicast manner in the NB-IoT system.

Optionally, the first configuration information and/or the second configuration information include: a narrowband of the multicast search space, a starting subframe of the multicast search space, a size of the multicast search space and/or an interval of the multicast search space. Alternatively, the third configuration information and/or the fourth configuration information include: a narrowband of the multicast search space, a starting subframe of the multicast search space, a size of the multicast search space and/or an interval of the multicast search space. Alternatively, the fifth configuration information and/or the sixth configuration information include: a narrowband of the multicast search space, a starting subframe of the multicast search space, a size of the multicast search space and/or an interval of the multicast search space. Alternatively, the seventh configuration information includes: a narrowband of the multicast search space, a starting subframe of the multicast search space, a size of the multicast search space and/or an interval of the multicast search space.

It is to be noted that in the embodiment, the first configuration information and the second configuration information both may include, but are not limited to, the narrowband of the multicast search space, the starting subframe of the multicast search space, the size of the multicast search space and/or the interval of the multicast search space. Similarly, the third configuration information and the fourth configuration information both may include, but are not limited to, the narrowband of the multicast search space, the starting subframe of the multicast search space, the size of the multicast search space and/or the interval of the multicast search space. The fifth configuration information and the sixth configuration information both may include, but are not limited to, the narrowband of the multicast search space, the starting subframe of the multicast search space, the size of the multicast search space and/or the interval of the multicast search space.

It is to be noted that in the embodiment, the first configuration information may include a unique set of configuration information. In this case, the first-type multicast search space and the third-type multicast search space share the same configuration information. Alternatively, the first configuration information includes two sets of configuration information. In this case, the first-type multicast search space and the third-type multicast search space respectively correspond to different configuration information.

Optionally, the multicast downlink control information has a same size as unicast downlink control information or a same size as paging downlink control information or a different size from the unicast downlink control information or the paging downlink control information.

It is to be noted that for a size of different types of multicast downlink control information, the same configuration or different configurations may be selected from the above configurations, which is not limited in the embodiment.

Optionally, the scheduling information of the multicast control channel data includes at least one of: a scheduling delay, resource allocation, a modulation and coding scheme, repetitions of multicast data and repetitions of downlink control information; and the scheduling information of the multicast traffic channel data includes at least one of: the scheduling delay, the resource allocation, the modulation and coding scheme, the repetitions of the multicast data, the repetitions of the downlink control information, a new data indicator and a HARQ process number.

An indication of the modulation and coding scheme in the scheduling information of the multicast control channel data includes merely quadrature phase-shift keying (QPSK), that is, the multicast control channel data supports merely the QPSK. Alternatively, an indication of the modulation and coding scheme includes QPSK and 16 quadrature amplitude modulation (QAM), that is, the multicast control channel data supports both the QPSK and the 16 QAM.

An indication of the modulation and coding scheme in the scheduling information of the multicast traffic channel data includes merely quadrature phase-shift keying (QPSK), that is, the multicast traffic channel data supports merely the QPSK. Alternatively, an indication of the modulation and coding scheme includes QPSK and 16 quadrature amplitude modulation (QAM), that is, the multicast traffic channel data supports both the QPSK and the 16 QAM.

An indication of the resource allocation in the scheduling information of the multicast control channel data supports merely a fixed number of resource blocks to be allocated. The fixed number of resource blocks is predefined or indicated by the multicast system information block. Alternatively, an indication of the resource allocation supports different numbers of resource blocks to be allocated. A maximum number of resource blocks which are allowed to be allocated is predefined or indicated by the multicast system information block. The former is conducive to saving control overheads, while the latter is conducive to improving resource allocation flexibility.

An indication of the resource allocation in the scheduling information of the multicast traffic channel data supports merely a fixed number of resource blocks to be allocated. The fixed number of resource blocks is predefined or indicated by the multicast control channel. Alternatively, an indication of the resource allocation supports different numbers of resource blocks to be allocated. A maximum number of resource blocks which are allowed to be allocated is predefined or indicated by the multicast control channel. The former is conducive to saving control overheads, while the latter is conducive to improving resource allocation flexibility.

Optionally, a search space supported by the first-type multicast search space, the second-type multicast search space and/or the third-type multicast search space may, but may not necessarily, have a same size as a search space supported by a paging search space or may, but may not necessarily, have a size in a subset of a set of sizes of the search space supported by the paging search space; and for a determined size of the multicast search space, a multicast candidate set in the first-type multicast search space, the second-type multicast search space or the third-type multicast search space may, but may not necessarily, be the same as a candidate set in the paging search space. Alternatively, a search space supported by the fourth-type multicast search space and/or the fifth-type multicast search space may, but may not necessarily, have a same size as a search space supported by a paging search space or may, but may not necessarily, have a size in a subset of a set of sizes of the search space supported by the paging search space; and for a determined size of the multicast search space, a multicast candidate set in one of the fourth-type multicast search space and the fifth-type multicast search space may, but may not necessarily, be the same as a candidate set in the paging search space. Alternatively, a search space supported by the sixth-type multicast search space and/or the seventh-type multicast search space has a same size as a search space supported by a paging search space or a size in a subset of a set of sizes of the search space supported by the paging search space; and for a determined size of the multicast search space, a multicast candidate set in one of the sixth-type multicast search space and the seventh-type multicast search space is the same as a candidate set in the paging search space. Alternatively, a search space supported by the eighth-type multicast search space has a same size as a search space supported by a paging search space or a size in a subset of a set of sizes of the search space supported by the paging search space; and for a determined size of the multicast search space, a multicast candidate set in the eighth-type multicast search space is the same as a candidate set in the paging search space.

It is to be noted that in the embodiment, a size of the search space supported by the first-type multicast search space, the second-type multicast search space and/or the third-type multicast search space may, but may not necessarily, refer to a size of a search space respectively supported by the above three types of multicast search spaces. Similarly, a size of the search space supported by the fourth-type multicast search space and/or the fifth-type multicast search space may, but may not necessarily, refer to a size of a search space respectively supported by the above two types of multicast search spaces. A size of the search space supported by the sixth-type multicast search space and/or the seventh-type multicast search space may, but may not necessarily, refer to a size of a search space respectively supported by the above two types of multicast search spaces.

Optionally, the first-type multicast downlink control information may, but may not necessarily, be configured for dynamic scheduling or semi-persistent scheduling of the multicast control channel data; and the second-type multicast downlink control information may, but may not necessarily, be configured for dynamic scheduling and/or semi-persistent scheduling of the multicast traffic channel data. Alternatively, the fourth-type multicast downlink control information may, but may not necessarily, be configured for dynamic scheduling or semi-persistent scheduling of the multicast control channel data; and the fifth-type multicast downlink control information may, but may not necessarily, be configured for dynamic scheduling and/or semi-persistent scheduling of the multicast traffic channel data. Alternatively, the sixth-type multicast downlink control information is configured for dynamic scheduling and/or semi-persistent scheduling of the multicast traffic channel data. Alternatively, the eighth-type multicast downlink control information is configured for dynamic scheduling and/or semi-persistent scheduling of the multicast traffic channel data.

In condition that one of the second-type multicast downlink control information, the fifth-type multicast downlink control information, the sixth-type multicast downlink control information and the eighth-type multicast downlink control information is configured for the dynamic scheduling and the semi-persistent scheduling and supports retransmission of the multicast traffic channel data, the one of the second-type multicast downlink control information, the fifth-type multicast downlink control information, the sixth-type multicast downlink control information and the eighth-type multicast downlink control information configured for the semi-persistent scheduling is merely configured for scheduling of a firstly-transmitted data packet; the one of the second-type multicast downlink control information, the fifth-type multicast downlink control information, the sixth-type multicast downlink control information and the eighth-type multicast downlink control information configured for the dynamic scheduling is merely configured for scheduling of a retransmitted data packet, or simultaneously configured for scheduling of the firstly-transmitted data packet and the retransmitted data packet.

Optionally, in condition that one of the second-type multicast downlink control information, the fifth-type multicast downlink control information, the sixth-type multicast downlink control information and the eighth-type multicast downlink control information is configured for release of the semi-persistent scheduling, at least one of the following fields: the scheduling delay, the resource allocation, the modulation and coding scheme, the repetitions of the multicast data, the new data indicator and the HARQ process number in the one of the second-type multicast downlink control information, the fifth-type multicast downlink control information, the sixth-type multicast downlink control information and the eighth-type multicast downlink control information is reserved for use.

Optionally, in condition that one of the second-type multicast downlink control information, the fifth-type multicast downlink control information, the sixth-type multicast downlink control information and the eighth-type multicast downlink control information is configured for activation of the semi-persistent scheduling, at least the new data indicator and the HARQ process number in the one of the second-type multicast downlink control information, the fifth-type multicast downlink control information, the sixth-type multicast downlink control information and the eighth-type multicast downlink control information are reserved for use.

Optionally, in condition that one of the second-type multicast downlink control information, the fifth-type multicast downlink control information, the sixth-type multicast downlink control information and the eighth-type multicast downlink control information is configured for the dynamic scheduling and the semi-persistent scheduling of the multicast traffic channel data, the multicast search space may, but may not necessarily, be set in a predefinition manner or in a manner of sending indication information. For example, predefining one of the following: the second-type multicast search space in which the second-type multicast downlink control information configured for the semi-persistent scheduling is allowed to be detected; the fifth-type multicast search space in which the fifth-type multicast downlink control information configured for the semi-persistent scheduling is allowed to be detected; the sixth-type multicast search space in which the sixth-type multicast downlink control information configured for the semi-persistent scheduling is allowed to be detected; and the eighth-type multicast search space in which the eighth-type multicast downlink control information configured for the semi-persistent scheduling is allowed to be detected. Alternatively, indicating, through the multicast control channel, one of the following; the second-type multicast search space in which the second-type multicast downlink control information configured for the semi-persistent scheduling is allowed to be detected; the fifth-type multicast search space in which the fifth-type multicast downlink control information configured for the semi-persistent scheduling is allowed to be detected; the sixth-type multicast search space in which the sixth-type multicast downlink control information configured for the semi-persistent scheduling is allowed to be detected; and the eighth-type multicast search space in which the eighth-type multicast downlink control information configured for the semi-persistent scheduling is allowed to be detected. Optionally, if the method is applied to a terminal device, in the second-type multicast search space in which the second-type multicast downlink control information configured for the semi-persistent scheduling is allowed to be detected, the terminal device simultaneously detects the second-type multicast downlink control information configured for the dynamic scheduling and the second-type multicast downlink control information configured for the semi-persistent scheduling, where when one of the second-type multicast downlink control information configured for the dynamic scheduling and the second-type multicast downlink control information configured for the semi-persistent scheduling is successfully detected, the terminal device stops detecting the other of the second-type multicast downlink control information configured for the dynamic scheduling and the second-type multicast downlink control information configured for the semi-persistent scheduling.

Alternatively, in the fifth-type multicast search space in which the fifth-type multicast downlink control information configured for the semi-persistent scheduling is allowed to be detected, the terminal device simultaneously detects the fifth-type multicast downlink control information configured for the dynamic scheduling and the fifth-type multicast downlink control information configured for the semi-persistent scheduling, where when one of the fifth-type multicast downlink control information configured for the dynamic scheduling and the fifth-type multicast downlink control information configured for the semi-persistent scheduling is successfully detected, the terminal device stops detecting the other of the fifth-type multicast downlink control information configured for the dynamic scheduling and the fifth-type multicast downlink control information configured for the semi-persistent scheduling.

Alternatively, in the sixth-type multicast search space in which the sixth-type multicast downlink control information configured for the semi-persistent scheduling is allowed to be detected, the terminal device simultaneously detects the sixth-type multicast downlink control information configured for the dynamic scheduling and the sixth-type multicast downlink control information configured for the semi-persistent scheduling, where when one of the sixth-type multicast downlink control information configured for the dynamic scheduling and the sixth-type multicast downlink control information configured for the semi-persistent scheduling is successfully detected, the terminal device stops detecting the other of the sixth-type multicast downlink control information configured for the dynamic scheduling and the sixth-type multicast downlink control information configured for the semi-persistent scheduling.

Alternatively, in the eighth-type multicast search space in which the eighth-type multicast downlink control information configured for the semi-persistent scheduling is allowed to be detected, the terminal device simultaneously detects the eighth-type multicast downlink control information configured for the dynamic scheduling and the eighth-type multicast downlink control information configured for the semi-persistent scheduling, where when one of the eighth-type multicast downlink control information configured for the dynamic scheduling and the eighth-type multicast downlink control information configured for the semi-persistent scheduling is successfully detected, the terminal device stops detecting the other of the eighth-type multicast downlink control information configured for the dynamic scheduling and the eighth-type multicast downlink control information configured for the semi-persistent scheduling.

Optionally, a random network temporary identifier of the multicast downlink control information may, but may not necessarily, be configured in the predefinition manner or in the manner of sending the indication information. For example, a random network temporary identifier for identifying the second-type multicast downlink control information configured for the dynamic scheduling or the semi-persistent scheduling is predefined or is indicated through the multicast control channel. Alternatively, a random network temporary identifier for identifying the fifth-type multicast downlink control information configured for the dynamic scheduling or the semi-persistent scheduling is predefined or is indicated through the multicast control channel. A radio network temporal identity for identifying the sixth-type multicast downlink control information is predefined or is indicated through the multicast control channel. A radio network temporal identity for identifying the eighth-type multicast downlink control information is predefined or is indicated through the multicast control channel.

Optionally, in condition that the second-type multicast downlink control information is configured for the dynamic scheduling and the semi-persistent scheduling of the multicast traffic channel data, the second-type multicast downlink control information configured for the dynamic scheduling and the second-type multicast downlink control information configured for the semi-persistent scheduling have different radio network temporal identities.

Optionally, in condition that the fifth-type multicast downlink control information is configured for the dynamic scheduling and the semi-persistent scheduling of the multicast traffic channel data, the fifth-type multicast downlink control information configured for the dynamic scheduling and the fifth-type multicast downlink control information configured for the semi-persistent scheduling have different radio network temporal identities.

Optionally, in condition that the sixth-type multicast downlink control information is configured for the dynamic scheduling and the semi-persistent scheduling of the multicast traffic channel data, the sixth-type multicast downlink control information configured for the dynamic scheduling and the sixth-type multicast downlink control information configured for the semi-persistent scheduling have different radio network temporal identities.

Optionally, in condition that the eighth-type multicast downlink control information is configured for the dynamic scheduling and the semi-persistent scheduling of the multicast traffic channel data, the eighth-type multicast downlink control information configured for the dynamic scheduling and the eighth-type multicast downlink control information configured for the semi-persistent scheduling have different radio network temporal identities.

Optionally, in condition that the terminal device is in a connected state and the multicast search space overlaps with (collides with) a unicast search space, the terminal device may, but may not necessarily, receive the multicast search space and the unicast search space in one of the manners described below.

In a manner 11, merely the unicast search space is received and the multicast search space is abandoned to be received.

In a manner 12, merely the multicast search space is received and the unicast search space is abandoned to be received.

In a manner 13, merely one of the unicast search space and the multicast search space, which appears earlier or later than the other of the unicast search space and the multicast search space, is received.

In a manner 14, the multicast search space is preferentially received, and when a first preset condition is met, the terminal device is allowed to continue to receive the unicast search space after the terminal device receives the multicast search space, and when the first preset condition is not met, the unicast search space is abandoned to be received.

In the manner 14, the first preset condition includes a condition 11, a condition 12 and a condition 13.

The condition 11 is that the multicast search space is located before the unicast search space.

The condition 12 is that the terminal device receives the multicast search space based on a specified candidate set of the multicast search space, where the specified candidate set of the multicast search space does not overlap with the unicast search space.

The condition 13 is that the terminal device has not successfully detected the multicast downlink control information, or has successfully detected one of the third-type multicast downlink control information and the seventh-type multicast downlink control information and determined that a practical candidate set for transmitting one of the third-type multicast downlink control information and the seventh-type multicast downlink control information does not overlap the unicast search space.

It is to be noted that when the terminal device is in the connected state and the multicast search space overlaps with the unicast search space, for different types of multicast search spaces, a manner of receiving the multicast search space may be the same as or different from a manner of receiving the unicast search space, which is not limited in the embodiment.

Optionally, in condition that the terminal device is in an idle state and the multicast search space overlaps with (collides with) a paging search space, the terminal device may, but may not necessarily, receive the multicast search space and the paging search space in one of the manners described below.

In a manner 21, merely the paging search space is received and the multicast search space is abandoned to be received.

In a manner 22, merely the multicast search space is received and the paging search space is abandoned to be received.

In a manner 23, merely one of the paging search space and the multicast search space, which appears earlier or later than the other of the paging search space and the multicast search space, is received.

In a manner 24, the multicast search space is preferentially received, and when a second preset condition is met, the terminal device is allowed to continue to receive the paging search space after the terminal device receives the multicast search space, and when the second preset condition is not met, the paging search space is abandoned to be received.

In the manner 24, the second preset condition includes a condition 21, a condition 22 and a condition 23. The condition 21 is that the multicast search space is located before the paging search space. The condition 22 is that the terminal device receives the multicast search space based on the specified candidate set of the multicast search space, where the specified candidate set does not overlap with the paging search space. The condition 23 is that the terminal device has not successfully detected the multicast downlink control information, or has successfully detected one of the third-type multicast downlink control information and the seventh-type multicast downlink control information and determined that the practical candidate set for transmitting one of the third-type multicast downlink control information and the seventh-type multicast downlink control information does not overlap with the paging search space.

In a manner 25, one of the paging search space and the multicast search space, which appears first, is preferentially received.

In the manner 25, when the multicast search space appears first and a third preset condition is met, the terminal device is allowed to continue to receive the paging search space after the terminal device receives the multicast search space, or otherwise the paging search space is abandoned to be received. The third preset condition includes the following: the terminal device receives the multicast search space based on the specified candidate set of the multicast search space, where the specified candidate set does not overlap with the paging search space; and the terminal device has not successfully detected the multicast downlink control information, or has successfully detected one of the third-type multicast downlink control information and the seventh-type multicast downlink control information and determined that the practical candidate set for transmitting one of the third-type multicast downlink control information and the seventh-type multicast downlink control information does not overlap with the paging search space.

Alternatively, when the paging search space appears first and a fourth preset condition is met, the terminal device is allowed to continue to receive the multicast search space after the terminal device receives the paging search space, or otherwise the multicast search space is abandoned to be received. The fourth preset condition includes the following: the terminal device receives the paging search space based on a specified candidate set of the paging search space, where the specified candidate set does not overlap with the multicast search space; and the terminal device has not successfully detected the paging downlink control information, or has successfully detected the paging downlink control information merely configured for a system information change notification purpose and determined that a practical candidate set for transmitting the paging downlink control information merely configured for the system information change notification purpose does not overlap with the multicast search space.

It is to be noted that when the terminal device is in the idle state and the multicast search space overlaps with the paging search space, for different types of multicast search spaces, the manner of receiving the multicast search space may be the same as or different from a manner of receiving the paging search space, which is not limited in the embodiment.

Optionally, when the terminal device is in the connected state, the terminal device may, but may not necessarily, detect the unicast downlink control information within the multicast search space.

Optionally, a manner in which the terminal device detects the unicast downlink control information may include, but is not limited to, one of the manners described below.

In a manner 31, the terminal device detects the unicast downlink control information according to the multicast candidate set.

In a manner 32, the terminal device detects the unicast downlink control information according to a candidate set in the unicast search space from a starting time of the multicast search space.

In a manner 33, the terminal device detects the unicast downlink control information according to a candidate set using a specified aggregation level in the candidate set in the unicast search space from the starting time of the multicast search space.

Optionally, in condition that the terminal device detects the unicast downlink control information according to the multicast candidate set, the unicast downlink control information has a same size as the multicast downlink control information in the multicast search space.

Optionally, in a case where merely the multicast search space is received and the unicast search space is abandoned to be received, in condition that the multicast search space completely covers the unicast search space in time domain, the terminal device detects the unicast downlink control information based on a resource of the multicast search space from a starting time of the unicast search space; where the unicast downlink control information is detected according to the candidate set in the unicast search space or the candidate set using the specified aggregation level in the candidate set in the unicast search space.

Optionally, in condition that the multicast downlink control information supports frequency hopping, configuration of the paging downlink control information is reused by at least one of the following parameters: a frequency hopping enable flag, a number of frequency hopping narrowbands, a frequency hopping interval and a frequency hopping offset.

It is to be noted that for different types of multicast downlink control information, the configuration of the above parameters may be the same or different, which is not limited in the embodiment.

Optionally, in condition that the multicast search space includes two types of multicast search spaces and the fourth-type multicast downlink control information does not include the multicast control channel change notification information, or the multicast search space includes one type of multicast search space, the terminal device acquires the multicast control channel change notification information using a master information block, the multicast system information block, the paging downlink control information or the RNTI.

From a network perspective, a base station indicates the multicast control channel change notification information through the master information block, the multicast system information block, the paging downlink control information or the RNTI. When the multicast search space includes two types of multicast search spaces (the fourth-type multicast search space and the fifth-type multicast search space) and the terminal device acquires the multicast control channel change notification information through the RNTI, the RNTI is the RNTI for identifying the fourth-type multicast downlink control information. Specifically, the RNTI for identifying the fourth-type multicast downlink control information includes a first RNTI configured for identifying that the fourth-type multicast downlink control information indicates a change of the multicast control channel and the other RNTI configured for identifying that the fourth-type multicast downlink control information indicates no change of the multicast control channel.

When the multicast search space includes one type of multicast search space (the eighth-type multicast search space) and the terminal device acquires the multicast control channel change notification information through the RNTI, the RNTI is the RNTI for identifying the eighth-type multicast downlink control information. Specifically, the RNTI for identifying the eighth-type multicast downlink control information includes a first RNTI configured for identifying that the eighth-type multicast downlink control information indicates a change of the multicast control channel and the other RNTI configured for identifying that the eighth-type multicast downlink control information indicates no change of the multicast control channel.

Optionally, for the terminal device having a receiving capability within a first bandwidth, a maximum bandwidth for receiving supported by the multicast traffic channel data is one of a first bandwidth, a second bandwidth, and the first bandwidth or the second bandwidth determined via signaling. The first bandwidth is greater than the second bandwidth.

Optionally, when the multicast channel data is the multicast traffic channel data, after the terminal device receives at least one multicast traffic channel data packet, the terminal device feeds back NACK information to a network side in responding to unsuccessfully decoding all of the at least one multicast traffic channel data packet.

Optionally, a transmission starting time of a signal for carrying the NACK information is predefined or configured through the multicast control channel and/or the multicast downlink control information.

Optionally, a transmission duration of the signal for carrying the NACK information is predefined, or configured through the multicast control channel and/or the multicast downlink control information, or determined according to a current coverage level of the terminal device, or determined according to a maximum number of transmission repetitions in numbers of transmission repetitions used by the terminal device to successfully decode the multicast downlink control information.

Optionally, the signal for carrying the NACK information has a preamble format.

Embodiment 2

A multicast transmission apparatus is provided in the embodiment. The apparatus is configured for implementing the above-mentioned embodiments and preferred implementation modes. What has been described will not be repeated. As used below, a term "module" may be software, hardware or a combination thereof capable of implementing predetermined functions. The apparatus in the embodiments described below is preferably implemented by software, but implementation by hardware or by a combination of software and hardware is also possible and conceived.

The multicast transmission apparatus provided in the embodiment includes a transmission module, which is configured to transmit multicast channel data according to a multicast search space. The multicast search space is configured for transmitting multicast downlink control information, and the multicast channel data includes at least one of multicast control channel data, multicast traffic channel data and multicast control channel change notification data.

Optionally, the multicast transmission apparatus may, but may not necessarily, be applied to a data transmission scenario in an NB-IoT system, for example, multicast transmission of data in the NB-IoT system.

Optionally, the abovementioned multicast transmission method may, but may not necessarily, be applied to a base station such as a macro base station, a micro base station, a pico base station and a home base station. The abovementioned multicast transmission method may further, but may not necessarily, be applied to a terminal such as a mobile phone, a PC, a notebook computer, a tablet computer, a smart wearable device and a smart home device.

In the above apparatus, the transmission module transmits the multicast channel data according to the multicast search space. The multicast search space is configured for transmitting the multicast downlink control information, and the multicast channel data includes at least one of the multicast control channel data, the multicast traffic channel data and the multicast control channel change notification data. It can be seen that the above solution is configured for transmitting the multicast channel data such as the multicast control channel data, the multicast traffic channel data and the multicast control channel change notification data according to the multicast search space for transmitting the multicast downlink control information to implement data transmission in a multicast manner in the NB-IoT system, thereby solving the problem in the related art that multicast transmission cannot be implemented in the NB-IoT system.

Optionally, the multicast search space includes a first-type multicast search space, a second-type multicast search space and a third-type multicast search space. The first-type multicast search space is configured for transmitting first-type multicast downlink control information including scheduling information of the multicast control channel data, the second-type multicast search space is configured for transmitting second-type multicast downlink control information including scheduling information of the multicast traffic channel data, and the third-type multicast search space is configured for transmitting third-type multicast downlink control information including multicast control channel change notification information. Alternatively, the multicast search space includes a fourth-type multicast search space and a fifth-type multicast search space. The fourth-type multicast search space is configured for transmitting fourth-type multicast downlink control information including scheduling information of the multicast control channel data or including the scheduling information of the multicast control channel data and multicast control channel change notification information, and the fifth-type multicast search space is configured for transmitting fifth-type multicast downlink control information including scheduling information of the multicast traffic channel data. Alternatively, the multicast search space includes a sixth-type multicast search space and a seventh-type multicast search space. The sixth-type multicast search space is configured for transmitting sixth-type multicast downlink control information including scheduling information of the multicast traffic channel data, and the seventh-type multicast search space is configured for transmitting seventh-type multicast downlink control information including multicast control channel change notification information. Alternatively, the multicast search space includes an eighth-type multicast search space. The eighth-type multicast search space is configured for transmitting eighth-type multicast downlink control information including scheduling information of the multicast traffic channel data.

Figure 2:
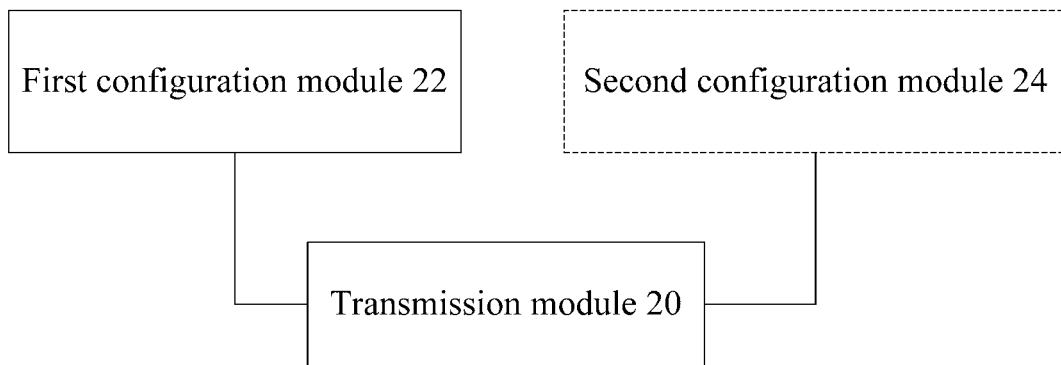
FIG. 2 is a block diagram 1 of a multicast transmission apparatus according to an embodiment of the present disclosure.

FIG. 2 is a block diagram 1 of a multicast transmission apparatus according to an embodiment of the present disclosure. As shown in FIG. 2, optionally, the apparatus further includes a first configuration module 22 or a second configuration module 24.

The first configuration module 22 is coupled to the transmission module 20 and configured to configure the first-type multicast search space and the third-type multicast search space based on first configuration information carried in a multicast system information block, and configure the second-type multicast search space based on second configuration information carried in a multicast control channel and/or the multicast system information block.

The second configuration module 24 is coupled to the transmission module 20 and configured to configure the fourth-type multicast search space based on third configuration information carried in a multicast system information block, and configure the fifth-type multicast search space based on fourth configuration information carried in a multicast control channel and/or the multicast system information block.

Optionally, the apparatus may further include a third configuration or a fourth configuration module. The third configuration module is configured to configure the seventh-type multicast search space based on fifth configuration information carried in a multicast system information block, and configure the sixth-type multicast search space based on sixth configuration information carried in a multicast control channel and/or the multicast system information block. The fourth configuration module is configured to configure the eighth-type multicast search space based on seventh configuration information carried in a multicast control channel and/or a multicast system information block.

Optionally, the first configuration information and/or the second configuration information include: a narrowband of the multicast search space, a starting subframe of the multicast search space, a size of the multicast search space and/or an interval of the multicast search space. Alternatively, the third configuration information and/or the fourth configuration information include: a narrowband of the multicast search space, a starting subframe of the multicast search space, a size of the multicast search space and/or an interval of the multicast search space. Alternatively, the fifth configuration information and/or the sixth configuration information include: a narrowband of the multicast search space, a starting subframe of the multicast search space, a size of the multicast search space and/or an interval of the multicast search space. Alternatively, the seventh configuration information includes: a narrowband of the multicast search space, a starting subframe of the multicast search space, a size of the multicast search space and/or an interval of the multicast search space.

It is to be noted that in the embodiment, the first configuration information and the second configuration information both may include, but are not limited to, the narrowband of the multicast search space, the starting subframe of the multicast search space, the size of the multicast search space and/or the interval of the multicast search space. Similarly, the third configuration information and the fourth configuration information both may include, but are not limited to, the narrowband of the multicast search space, the starting subframe of the multicast search space, the size of the multicast search space and/or the interval of the multicast search space. The fifth configuration information and the sixth configuration information both may include, but are not limited to, the narrowband of the multicast search space, the starting subframe of the multicast search space, the size of the multicast search space and/or the interval of the multicast search space.

Optionally, the multicast downlink control information has a same size as unicast downlink control information or a same size as paging downlink control information or a different size from the unicast downlink control information or the paging downlink control information.

Optionally, the scheduling information of the multicast control channel data includes at least one of: a scheduling delay, resource allocation, a modulation and coding scheme, repetitions of multicast data and repetitions of downlink control information; and the scheduling information of the multicast traffic channel data includes at least one of: the scheduling delay, the resource allocation, the modulation and coding scheme, the repetitions of the multicast data, the repetitions of the downlink control information, a new data indicator and a HARQ process number.

Optionally, a search space supported by the first-type multicast search space, the second-type multicast search space and/or the third-type multicast search space has a same size as a search space supported by a paging search space or a size in a subset of a set of sizes of the search space supported by the paging search space; and for a determined size of the multicast search space, a multicast candidate set in one of the first-type multicast search space, the second-type multicast search space and the third-type multicast search space is the same as a candidate set in the paging search space. Alternatively, a search space supported by the fourth-type multicast search space and/or the fifth-type multicast search space has a same size as a search space supported by a paging search space or a size in a subset of a set of sizes of the search space supported by the paging search space; and for a determined size of the multicast search space, a multicast candidate set in one of the fourth-type multicast search space and the fifth-type multicast search space is the same as a candidate set in the paging search space. Alternatively, a search space supported by the sixth-type multicast search space and/or the seventh-type multicast search space has a same size as a search space supported by a paging search space or a size in a subset of a set of sizes of the search space supported by the paging search space; and for a determined size of the multicast search space, a multicast candidate set in one of the sixth-type multicast search space and the seventh-type multicast search space is the same as a candidate set in the paging search space. Alternatively, a search space supported by the eighth-type multicast search space has a same size as a search space supported by a paging search space or a size in a subset of a set of sizes of the search space supported by the paging search space; and for a determined size of the multicast search space, a multicast candidate set in the eighth-type multicast search space is the same as a candidate set in the paging search space.

It is to be noted that in the embodiment, a size of the search space supported by the first-type multicast search space, the second-type multicast search space and/or the third-type multicast search space may, but may not necessarily, refer to a size of a search space respectively supported by the above three types of multicast search spaces. Similarly, a size of the search space supported by the fourth-type multicast search space and/or the fifth-type multicast search space may, but may not necessarily, refer to a size of a search space respectively supported by the above two types of multicast search spaces. A size of the search space supported by the sixth-type multicast search space and/or the seventh-type multicast search space may, but may not necessarily, refer to a size of a search space respectively supported by the above two types of multicast search spaces.

Optionally, the first-type multicast downlink control information is configured for dynamic scheduling or semi-persistent scheduling of the multicast control channel data, and the second-type multicast downlink control information is configured for dynamic scheduling and/or semi-persistent scheduling of the multicast traffic channel data. Alternatively, the fourth-type multicast downlink control information is configured for dynamic scheduling or semi-persistent scheduling of the multicast control channel data, and the fifth-type multicast downlink control information is configured for dynamic scheduling and/or semi-persistent scheduling of the multicast traffic channel data. Alternatively, the sixth-type multicast downlink control information is configured for dynamic scheduling and/or semi-persistent scheduling of the multicast traffic channel data. Alternatively, the eighth-type multicast downlink control information is configured for dynamic scheduling and/or semi-persistent scheduling of the multicast traffic channel data.

In condition that one of the second-type multicast downlink control information, the fifth-type multicast downlink control information, the sixth-type multicast downlink control information and the eighth-type multicast downlink control information is configured for the dynamic scheduling and the semi-persistent scheduling and supports retransmission of the multicast traffic channel data, the one of the second-type multicast downlink control information, the fifth-type multicast downlink control information and the eighth-type multicast downlink control information configured for the semi-persistent scheduling is merely configured for scheduling of a firstly-transmitted data packet; the one of the second-type multicast downlink control information, the fifth-type multicast downlink control information, the sixth-type multicast downlink control information and the eighth-type multicast downlink control information configured for the dynamic scheduling is merely configured for scheduling of a retransmitted data packet, or simultaneously configured for scheduling of the firstly-transmitted data packet and the retransmitted data packet.

Optionally, in condition that one of the second-type multicast downlink control information, the fifth-type multicast downlink control information, the sixth-type multicast downlink control information and the eighth-type multicast downlink control information is configured for release of the semi-persistent scheduling, at least one of the following fields: the scheduling delay, the resource allocation, the modulation and coding scheme, the repetitions of the multicast data, the new data indicator and the HARQ process number in the one of the second-type multicast downlink control information, the fifth-type multicast downlink control information, the sixth-type multicast downlink control information and the eighth-type multicast downlink control information is reserved for use.

Optionally, in condition that one of the second-type multicast downlink control information, the fifth-type multicast downlink control information, the sixth-type multicast downlink control information and the eighth-type multicast downlink control information is configured for activation of the semi-persistent scheduling, at least the new data indicator and the HARQ process number in the one of the second-type multicast downlink control information, the fifth-type multicast downlink control information, the sixth-type multicast downlink control information and the eighth-type multicast downlink control information are reserved for use.

Figure 3:
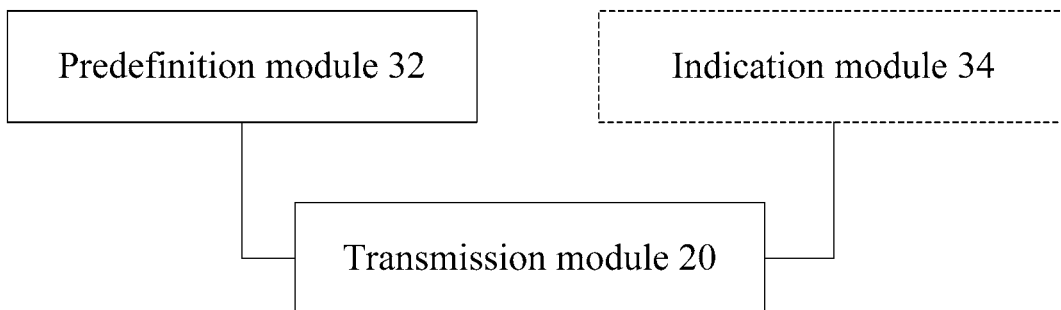
FIG. 3 is a block diagram 2 of a multicast transmission apparatus according to an embodiment of the present disclosure.

FIG. 3 is a block diagram 2 of a multicast transmission apparatus according to an embodiment of the present disclosure. As shown in FIG. 3, optionally, the apparatus further includes one of a predefinition module 32 and an indication module 34.

The predefinition module 32 is coupled to the transmission module 20 and configured to, in condition that one of the second-type multicast downlink control information and the fifth-type multicast downlink control information is configured for the dynamic scheduling and the semi-persistent scheduling of the multicast traffic channel data, predefine one of the following: the second-type multicast search space in which the second-type multicast downlink control information configured for the semi-persistent scheduling is allowed to be detected; the fifth-type multicast search space in which the fifth-type multicast downlink control information configured for the semi-persistent scheduling is allowed to be detected; the sixth-type multicast search space in which the sixth-type multicast downlink control information configured for the semi-persistent scheduling is allowed to be detected; and the eighth-type multicast search space in which the eighth-type multicast downlink control information configured for the semi-persistent scheduling is allowed to be detected.

The indication module 32 is coupled to the transmission module 20 and configured to, in condition that the one of the second-type multicast downlink control information and the fifth-type multicast downlink control information is configured for the dynamic scheduling and the semi-persistent scheduling of the multicast traffic channel data, indicate, through the multicast control channel, one of the following: the second-type multicast search space in which the second-type multicast downlink control information configured for the semi-persistent scheduling is allowed to be detected; the fifth-type multicast search space in which the fifth-type multicast downlink control information configured for the semi-persistent scheduling is allowed to be detected; the sixth-type multicast search space in which the sixth-type multicast downlink control information configured for the semi-persistent scheduling is allowed to be detected; and the eighth-type multicast search space in which the eighth-type multicast downlink control information configured for the semi-persistent scheduling is allowed to be detected.

When the apparatus is applied to a terminal device, optionally, the apparatus further includes one of a first detection module, a second detection module, a fourth detection module and a fifth detection module.

The first detection module is coupled to the transmission module 20 and configured to, in the second-type multicast search space in which the second-type multicast downlink control information configured for the semi-persistent scheduling is allowed to be detected, simultaneously detect the second-type multicast downlink control information configured for the dynamic scheduling and the second-type multicast downlink control information configured for the semi-persistent scheduling, where when one of the second-type multicast downlink control information configured for the dynamic scheduling and the second-type multicast downlink control information configured for the semi-persistent scheduling is successfully detected, the first detection module stops detecting the other of the second-type multicast downlink control information configured for the dynamic scheduling and the second-type multicast downlink control information configured for the semi-persistent scheduling.

The second detection module is coupled to the transmission module 20 and configured to, in the fifth-type multicast search space in which the fifth-type multicast downlink control information configured for the semi-persistent scheduling is allowed to be detected, simultaneously detect the fifth-type multicast downlink control information configured for the dynamic scheduling and the fifth-type multicast downlink control information configured for the semi-persistent scheduling, where when one of the fifth-type multicast downlink control information configured for the dynamic scheduling and the fifth-type multicast downlink control information configured for the semi-persistent scheduling is successfully detected, the second detection module stops detecting the other of the fifth-type multicast downlink control information configured for the dynamic scheduling and the fifth-type multicast downlink control information configured for the semi-persistent scheduling.

The fourth detection module is configured to, in the sixth-type multicast search space in which the sixth-type multicast downlink control information configured for the semi-persistent scheduling is allowed to be detected, simultaneously detect the sixth-type multicast downlink control information configured for the dynamic scheduling and the sixth-type multicast downlink control information configured for the semi-persistent scheduling, where when one of the sixth-type multicast downlink control information configured for the dynamic scheduling and the sixth-type multicast downlink control information configured for the semi-persistent scheduling is successfully detected, the terminal device stops detecting the other of the sixth-type multicast downlink control information configured for the dynamic scheduling and the sixth-type multicast downlink control information configured for the semi-persistent scheduling.

The fifth detection module is configured to, in the eighth-type multicast search space in which the eighth-type multicast downlink control information configured for the semi-persistent scheduling is allowed to be detected, the terminal device simultaneously detects the eighth-type multicast downlink control information configured for the dynamic scheduling and the eighth-type multicast downlink control information configured for the semi-persistent scheduling, where when one of the eighth-type multicast downlink control information configured for the dynamic scheduling and the eighth-type multicast downlink control information configured for the semi-persistent scheduling is successfully detected, the terminal device stops detecting the other of the eighth-type multicast downlink control information configured for the dynamic scheduling and the eighth-type multicast downlink control information configured for the semi-persistent scheduling.

Optionally, the apparatus further includes one of a first processing module, a second processing module, a third processing module and a fourth processing module.

The first processing module is coupled to the transmission module 20 and configured to indicate through a multicast control channel or predefine a radio network temporal identity for identifying the second-type multicast downlink control information.

The second processing module is coupled to the transmission module 20 and configured to indicate through the multicast control channel or predefine a radio network temporal identity for identifying the fifth-type multicast downlink control information.

The third processing module is configured to indicate through the multicast control channel or predefine a radio network temporal identity for identifying the sixth-type multicast downlink control information.

The fourth processing module is configured to indicate through the multicast control channel or predefine a radio network temporal identity for identifying the eighth-type multicast downlink control information.

Optionally, in condition that the second-type multicast downlink control information is configured for the dynamic scheduling and the semi-persistent scheduling of the multicast traffic channel data, the second-type multicast downlink control information configured for the dynamic scheduling and the second-type multicast downlink control information configured for the semi-persistent scheduling have different radio network temporal identities. In condition that the fifth-type multicast downlink control information is configured for the dynamic scheduling and the semi-persistent scheduling of the multicast traffic channel data, the fifth-type multicast downlink control information configured for the dynamic scheduling and the fifth-type multicast downlink control information configured for the semi-persistent scheduling have different radio network temporal identities. In condition that the sixth-type multicast downlink control information is configured for the dynamic scheduling and the semi-persistent scheduling of the multicast traffic channel data, the sixth-type multicast downlink control information configured for the dynamic scheduling and the sixth-type multicast downlink control information configured for the semi-persistent scheduling have different radio network temporal identities. In condition that the eighth-type multicast downlink control information is configured for the dynamic scheduling and the semi-persistent scheduling of the multicast traffic channel data, the eighth-type multicast downlink control information configured for the dynamic scheduling and the eighth-type multicast downlink control information configured for the semi-persistent scheduling have different radio network temporal identities.

When the apparatus is applied to the terminal device, optionally, the apparatus further includes a first receiving module.

The first receiving module is coupled to the transmission module 20 and configured to, In condition that the terminal device is in a connected state and the multicast search space overlaps with (collides with) a unicast search space, receive the multicast search space and the unicast search space by one of the following described below.

Merely the unicast search space is received and the multicast search space is abandoned to be received.

Merely the multicast search space is received and the unicast search space is abandoned to be received.

Merely one of the unicast search space and the multicast search space, which appears earlier or later the other of the unicast search space and the multicast search space, is received.

The multicast search space is preferentially received, and when a first preset condition is met, the terminal device is allowed to continue to receive the unicast search space after the terminal device receives the multicast search space, and when the first preset condition is not met, the unicast search space is abandoned to be received.

The first preset condition includes the following: the multicast search space is located before the unicast search space; the terminal device receives the multicast search space based on a specified candidate set of the multicast search space, where the specified candidate set of the multicast search space does not overlap with the unicast search space; and the terminal device has not successfully detected the multicast downlink control information, or has successfully detected one of the third-type multicast downlink control information and the seventh-type multicast downlink control information and determined that a practical candidate set for transmitting one of the third-type multicast downlink control information and the seventh-type multicast downlink control information does not overlap with the unicast search space.

When the apparatus is applied to the terminal device, optionally, the apparatus further includes a second receiving module.

The second receiving module is coupled to the transmission module 20 and configured to, in condition that the terminal device is in an idle state and the multicast search space overlaps with (collides with) a paging search space, receive the multicast search space and the paging search space by one of the following described below.

Merely the paging search space is received and the multicast search space is abandoned to be received.

Merely the multicast search space is received and the paging search space is abandoned to be received.

Merely one of the paging search space and the multicast search space, which appears earlier or later than the other of the paging search space and the multicast search space is received.

The multicast search space is preferentially received, and when a second preset condition is met, the terminal device is allowed to continue to receive the paging search space after the terminal device receives the multicast search space, and when the second preset condition is not met, the paging search space is abandoned to be received. The second preset condition includes the following: the multicast search space is located before the paging search space; the terminal device receives the multicast search space based on the specified candidate set of the multicast search space, where the specified candidate set of the multicast search space does not overlap with the paging search space; and the terminal device has not successfully detected the multicast downlink control information, or has successfully detected one of the third-type multicast downlink control information and the seventh-type multicast downlink control information and determined that the practical candidate set for transmitting one of the third-type multicast downlink control information and the seventh-type multicast downlink control information does not overlap with the paging search space.

A search space appearing first between the paging search space and the multicast search space is preferentially received.

When the multicast search space appears first and a third preset condition is met, the terminal device is allowed to continue to receive the paging search space after receiving the multicast search space, or otherwise the paging search space is abandoned to be received. The third preset condition includes the following: the terminal device receives the multicast search space based on the specified candidate set of the multicast search space, where the specified candidate set does not overlap with the paging search space; and the terminal device has not successfully detected the multicast downlink control information, or has successfully detected one of the third-type multicast downlink control information and the seventh-type multicast downlink control information and determined that the practical candidate set for transmitting one of the third-type multicast downlink control information and the seventh-type multicast downlink control information does not overlap the paging search space.

Alternatively, when the paging search space appears first and a fourth preset condition is met, the terminal device is allowed to continue to receive the multicast search space after receiving the paging search space, or otherwise the multicast search space is abandoned to be received. The fourth preset condition includes the following: the terminal device receives the paging search space based on a specified candidate set of the paging search space, where the specified candidate set does not overlap with the multicast search space; and the terminal device has not successfully detected paging downlink control information, or has successfully detected the paging downlink control information merely configured for a system information change notification purpose and determined that a practical candidate set for transmitting the paging downlink control information merely configured for the system information change notification purpose does not overlap with the multicast search space.

When the apparatus is applied to the terminal device, optionally, the apparatus further includes a third detection module.

The third detection module is coupled to the transmission module 20 and configured to, in condition that the terminal device is in the connected state, detect the unicast downlink control information within the multicast search space.

Optionally, the third detection module is configured to perform one of the following operations: the terminal device detects the unicast downlink control information according to the multicast candidate set; the terminal device detects the unicast downlink control information according to a candidate set in the unicast search space from a starting time of the multicast search space; and the terminal device detects the unicast downlink control information according to a candidate set using a specified aggregation level in the candidate set in the unicast search space from the starting time of the multicast search space.

Optionally, in condition that the terminal device detects the unicast downlink control information according to the multicast candidate set, the unicast downlink control information has a same size as the multicast downlink control information in the multicast search space.

Optionally, in a case where merely the multicast search space is received and the unicast search space is abandoned to be received, in condition that the multicast search space completely covers the unicast search space in time domain, the terminal device detects the unicast downlink control information based on a resource of the multicast search space from a starting time of the unicast search space, where the unicast downlink control information is detected according to the candidate set in the unicast search space or the candidate set using the specified aggregation level in the candidate set in the unicast search space.

Optionally, in condition that the multicast downlink control information supports frequency hopping, configuration of the paging downlink control information is reused by at least one of the following parameters: a frequency hopping enable flag, a number of frequency hopping narrowbands, a frequency hopping interval and a frequency hopping offset.

Optionally, in condition that the multicast search space includes two types of multicast search spaces and the fourth-type multicast downlink control information does not include the multicast control channel change notification information, or the multicast search space includes one type of multicast search space, the terminal device acquires the multicast control channel change notification information using a master information block, the multicast system information block, the paging downlink control information or the RNTI.

It is to be noted that the various modules described above may be implemented by software or hardware. Implementation by hardware may, but not necessarily, be performed in the following manner: the various modules described above are located in a same processor or their respective processors.

Optionally, for the terminal device having a receiving capability within a first bandwidth, a maximum bandwidth for receiving supported by the multicast traffic channel data is one of a first bandwidth, a second bandwidth, and the first bandwidth or the second bandwidth determined via signaling. The first bandwidth is greater than the second bandwidth.

Optionally, in condition that the multicast channel data is the multicast traffic channel data, after the terminal device receives at least one multicast traffic channel data packet, the terminal device feeds back NACK information to a network side in responding to unsuccessfully decoding all of the at least one multicast traffic channel data packet.

Optionally, a transmission starting time of a signal for carrying the NACK information is predefined or configured through the multicast control channel and/or the multicast downlink control information.

Optionally, a transmission duration of the signal for carrying the NACK information is predefined, or configured through the multicast control channel and/or the multicast downlink control information, or determined according to a current coverage level of the terminal device, or determined according to a maximum number of transmission repetitions in numbers of transmission repetitions used by the terminal device to successfully decode the multicast downlink control information.

Optionally, the signal for carrying the NACK information has a preamble format.

The present disclosure will be described below in detail in conjunction with an optional embodiment.

The optional embodiment of the present disclosure provides a multicast transmission method in which multicast channel data is transmitted according to a multicast search space (SS).

The multicast search space is also referred to as a common search space for a multicast purpose.

The multicast channel data may include, but is not limited to, at least one of the following:

multicast control channel (MCCH) data, multicast traffic channel (MTCH) data and MCCH change notification data.

The multicast search space may include, but is not limited to, three types of multicast search spaces.

A first-type multicast search space is configured for transmitting first-type multicast downlink control information (DCI), a second-type multicast search space is configured for transmitting second-type multicast downlink control information, and a third-type multicast search space is configured for transmitting third-type multicast downlink control information. The first-type multicast downlink control information includes scheduling information of the multicast control channel data, the second-type multicast downlink control information includes scheduling information of the multicast traffic channel data, and the third-type multicast downlink control information includes multicast control channel change notification information. The first-type multicast search space and the third-type multicast search space are configured through a multicast system information block (the first-type multicast search space and the third-type multicast search space respectively corresponds to two different sets of configuration parameters in the multicast system information block), and the second-type multicast search space is configured through a multicast control channel and/or the multicast system information block.

It is to be noted that the multicast system information block is a system information block (SIB) dedicated to carrying multicast system information or carrying the multicast system information.

Configuration information for the first-type multicast search space includes at least one of a narrowband of the multicast search space, a starting subframe of the multicast search space, a size of the multicast search space (denoted as Rmax) and an interval of the multicast search space (denoted as G). Configuration information for the second-type multicast search space includes at least one of the narrowband of the multicast search space, the starting subframe of the multicast search space, the size of the multicast search space and the interval of the multicast search space. Configuration information for the third-type multicast search space includes at least one of the narrowband of the multicast search space, the starting subframe of the multicast search space, the size of the multicast search space and the interval of the multicast search space.

Optionally, when frequency hopping transmission of the multicast downlink control information is enabled, the narrowband of the multicast search space represents an initial narrowband of the multicast downlink control information corresponding to the multicast search space.

Optionally, the size of the multicast search space is a number of valid subframes. For example, in condition that the size of the multicast search space is configured as Rmax, Rmax indicates that the multicast search space includes Rmax valid subframes. The valid subframe (also referred to as an available subframe) supports multicast transmission of data.

Optionally, the starting subframe of the multicast search space is configured for determining the multicast search space specifically starts from which subframes. The interval of the multicast search space is a number of physical subframes and configured for determining an interval between two adjacent multicast search spaces when a terminal device needs to continuously detect more than one multicast search space from the starting subframe of each of the configured multicast search spaces. The interval is equal to a value of an interval of the configured multicast search spaces or a product of the value of the interval (G) of the configured multicast search spaces and the size of the multicast search space (Rmax). When the terminal device detects merely one multicast search space from the starting subframe of each of the configured multicast search spaces, the interval of the multicast search space is not required or meaningless.

The first-type multicast downlink control information has a same size as downlink control information for unicast data scheduling or a same size as downlink control information for paging message scheduling or a different size from each of the downlink control information for the unicast data scheduling and the downlink control information for paging message scheduling.

The second-type multicast downlink control information has a same size as the downlink control information for the unicast data scheduling or a same size as the downlink control information for the paging message scheduling or a different size from each of the downlink control information for the unicast data scheduling and the downlink control information for paging message scheduling. The third-type multicast downlink control information has a same size as the downlink control information for the unicast data scheduling or a same size as the downlink control information for the paging message scheduling or a different size from each of the downlink control information for the unicast data scheduling and the downlink control information for paging message scheduling.

The first-type multicast downlink control information includes at least one of: a scheduling delay, resource allocation, a modulation and coding scheme, repetitions of multicast data and repetitions of a downlink control channel. The second-type multicast downlink control information includes at least one of: the scheduling delay, the resource allocation, the modulation and coding scheme, the repetitions of the multicast data, the repetitions of the downlink control channel, a new data indicator and a HARQ process number. The third-type multicast downlink control information includes at least a multicast control channel change indication.

A multicast search space supported by the first-type multicast search space has a same size as a paging search space supported by a paging search space or a size in a subset of a set of sizes of the paging search space supported by the paging search space; and for a determined size of the multicast search space, a multicast candidate set in the first-type multicast search space is the same as a candidate set in the paging search space.

A multicast search space supported by the second-type multicast search space has a same size as the paging search space supported by the paging search space or a size in the subset of the set of sizes of the paging search space supported by the paging search space; and for the determined size of the multicast search space, a multicast candidate set in the second-type multicast search space is the same as the candidate set in the paging search space.

A multicast search space supported by the third-type multicast search space has a same size as the paging search space supported by the paging search space or a size in the subset of the set of sizes of the paging search space supported by the paging search space; and for the determined size of the multicast search space, a multicast candidate set in the third-type multicast search space is the same as the candidate set in the paging search space.

Alternatively, the multicast search space may include, but is not limited to, a fourth-type multicast search space and a fifth-type multicast search space. The fourth-type multicast search space is configured for transmitting fourth-type multicast downlink control information and the fifth-type multicast search space is configured for transmitting fifth-type multicast downlink control information. The fourth-type multicast downlink control information includes scheduling information of the multicast control channel data or includes the scheduling information of the multicast control channel data and multicast control channel change notification information. The fifth-type multicast downlink control information includes scheduling information of the multicast traffic channel data. The fourth-type multicast search space is configured through a multicast system information block and the fifth-type multicast search space is configured through a multicast control channel and/or the multicast system information block.

Configuration information for the fourth-type multicast search space includes at least one of a narrowband of the multicast search space, a starting subframe of the multicast search space, a size of the multicast search space (denoted as Rmax) and an interval of the multicast search space (denoted as G). Configuration information for the fifth-type multicast search space includes at least one of the narrowband of the multicast search space, the starting subframe of the multicast search space, the size of the multicast search space and the interval of the multicast search space.

Optionally, when frequency hopping transmission of the multicast downlink control information is enabled, the narrowband of the multicast search space represents an initial narrowband of the multicast downlink control information corresponding to the multicast search space.

Optionally, the size of the multicast search space is a number of valid subframes. For example, in condition that the size of the multicast search space is configured as Rmax, Rmax indicates that the multicast search space includes Rmax valid subframes. The valid subframe (also referred to as an available subframe) supports multicast transmission of data.

Optionally, the starting subframe of the multicast search space is configured for determining the multicast search space specifically starts from which subframes. The interval of the multicast search space is a number of physical subframes and configured for determining an interval between two adjacent multicast search spaces when a terminal device needs to continuously detect more than one multicast search space from the starting subframe of each of the configured multicast search spaces. The interval is equal to a value of an interval of the configured multicast search spaces or a product of the value of the interval (G) of the configured multicast search spaces and the size of the multicast search space (Rmax). When the terminal device detects merely one multicast search space from the starting subframe of each of the configured multicast search spaces, the interval of the multicast search space is not required or meaningless.

The fourth-type multicast downlink control information has a same size as downlink control information for unicast data scheduling or a same size as downlink control information for paging message scheduling or a different size from each of the downlink control information for the unicast data scheduling and the downlink control information for paging message scheduling. The fifth-type multicast downlink control information has a same size as the downlink control information for the unicast data scheduling or a same size as the downlink control information for the paging message scheduling or a different size from each of the downlink control information for the unicast data scheduling and the downlink control information for paging message scheduling.

The fourth-type multicast downlink control information includes at least one of: a multicast control channel change indication, a scheduling delay, resource allocation, a modulation and coding scheme, repetitions of multicast data and repetitions of a downlink control channel. The fifth-type multicast downlink control information includes at least one of: the scheduling delay, the resource allocation, the modulation and coding scheme, the repetitions of the multicast data, the repetitions of the downlink control channel, a new data indicator and a HARQ process number.

A multicast search space supported by the fourth-type multicast search space has a same size as a paging search space supported by a paging search space or a size in a subset of a set of sizes of the paging search space supported by the paging search space; and for a determined size of the multicast search space, a multicast candidate set in the fourth-type multicast search space is the same as a candidate set in the paging search space.

A multicast search space supported by the fifth-type multicast search space has a same size as the paging search space supported by the paging search space or a size in the subset of the set of sizes of the paging search space supported by the paging search space; and for the determined size of the multicast search space, a multicast candidate set in the fifth-type multicast search space is the same as the candidate set in the paging search space.

Alternatively, the multicast search space may include, but is not limited to a sixth-type multicast search space and a seventh-type multicast search space. The sixth-type multicast search space is configured for transmitting sixth-type multicast downlink control information including scheduling information of the multicast traffic channel data. The seventh-type multicast search space is configured for transmitting seventh-type multicast downlink control information including multicast control channel change notification information. The seventh-type multicast search space is configured through a multicast system information block and the sixth-type multicast search space is configured through a multicast control channel and/or the multicast system information block.

Configuration information for the sixth-type multicast search space includes at least one of a narrowband of the multicast search space, a starting subframe of the multicast search space, a size of the multicast search space (denoted as Rmax) and an interval of the multicast search space (denoted as G). Configuration information for the seventh-type multicast search space includes at least one of the narrowband of the multicast search space, the starting subframe of the multicast search space, the size of the multicast search space and the interval of the multicast search space.

Optionally, when frequency hopping transmission of the multicast downlink control information is enabled, the narrowband of the multicast search space represents an initial narrowband of the multicast downlink control information corresponding to the multicast search space.

Optionally, the size of the multicast search space is a number of valid subframes. For example, in condition that the size of the multicast search space is configured as Rmax, Rmax indicates that the multicast search space includes Rmax valid subframes. The valid subframe (also referred to as an available subframe) supports multicast transmission of data.

Optionally, the starting subframe of the multicast search space is configured for determining the multicast search space specifically starts from which subframes. The interval of the multicast search space is a number of physical subframes and configured for determining an interval between two adjacent multicast search spaces when a terminal device needs to continuously detect more than one multicast search space from the starting subframe of each of the configured multicast search spaces. The interval is equal to a value of an interval of the configured multicast search spaces or a product of the value of the interval (G) of the configured multicast search spaces and the size of the multicast search space (Rmax). When the terminal device detects merely one multicast search space from the starting subframe of each of the configured multicast search spaces, the interval of the multicast search space is not required or meaningless.

The sixth-type multicast downlink control information has a same size as downlink control information for unicast data scheduling or a same size as downlink control information for paging message scheduling or a different size from each of the downlink control information for the unicast data scheduling and the downlink control information for paging message scheduling. The seventh-type multicast downlink control information has a same size as the downlink control information for the unicast data scheduling or a same size as the downlink control information for the paging message scheduling or a different size from each of the downlink control information for the unicast data scheduling and the downlink control information for paging message scheduling.

The sixth-type multicast downlink control information includes at least one of: a scheduling delay, resource allocation, a modulation and coding scheme, repetitions of multicast data and repetitions of a downlink control channel, a new data indicator and a HARQ process number. The seventh-type multicast downlink control information includes at least a multicast control channel change indication.

A multicast search space supported by the sixth-type multicast search space has a same size as a paging search space supported by a paging search space or a size in a subset of a set of sizes of the paging search space supported by the paging search space; and for a determined size of the multicast search space, a multicast candidate set in the sixth-type multicast search space is the same as a candidate set in the paging search space.

A multicast search space supported by the seventh-type multicast search space has a same size as the paging search space supported by the paging search space or a size in the subset of the set of sizes of the paging search space supported by the paging search space; and for the determined size of the multicast search space, a multicast candidate set in the seventh-type multicast search space is the same as the candidate set in the paging search space.

Alternatively, the multicast search space may include, but is not limited to, an eighth-type multicast search space. The eighth-type multicast search space is configured for transmitting eighth-type multicast downlink control information including scheduling information of the multicast traffic channel data. The eighth-type multicast search space is configured through a multicast control channel and/or a multicast system information block.

Configuration information for the eighth-type multicast search space includes at least one of a narrowband of the multicast search space, a starting subframe of the multicast search space, a size of the multicast search space (denoted as Rmax) and an interval of the multicast search space (denoted as G).

Optionally, when frequency hopping transmission of the multicast downlink control information is enabled, the narrowband of the multicast search space represents an initial narrowband of the multicast downlink control information corresponding to the multicast search space.

Optionally, the size of the multicast search space is a number of valid subframes. For example, in condition that the size of the multicast search space is configured as Rmax, Rmax indicates that the multicast search space includes Rmax valid subframes. The valid subframe (also referred to as an available subframe) supports multicast transmission of data.

Optionally, the starting subframe of the multicast search space is configured for determining the multicast search space specifically starts from which subframes. The interval of the multicast search space is a number of physical subframes and configured for determining an interval between two adjacent multicast search spaces when a terminal device needs to continuously detect more than one multicast search space from the starting subframe of each of the configured multicast search spaces. The interval is equal to a value of an interval of the configured multicast search spaces or a product of the value of the interval (G) of the configured multicast search spaces and the size of the multicast search space (Rmax). When the terminal device detects merely one multicast search space from the starting subframe of each of the configured multicast search spaces, the interval of the multicast search space is not required or meaningless.

The eighth-type multicast downlink control information has a same size as downlink control information for unicast data scheduling or a same size as downlink control information for paging message scheduling or a different size from each of the downlink control information for the unicast data scheduling and the downlink control information for paging message scheduling.

The eighth-type multicast downlink control information includes at least one of: a scheduling delay, resource allocation, a modulation and coding scheme, repetitions of multicast data and repetitions of a downlink control channel, a new data indicator and a HARQ process number.

A multicast search space supported by the eighth-type multicast search space has a same size as a paging search space supported by a paging search space or a size in a subset of a set of sizes of the paging search space supported by the paging search space; and for a determined size of the multicast search space, a multicast candidate set in the eighth-type multicast search space is the same as a candidate set in the paging search space.

The first-type multicast downlink control information (or the fourth-type multicast downlink control information) is configured for dynamic scheduling or semi-persistent scheduling (SPS) of the multicast control channel data. The second-type multicast downlink control information (or the fifth-type multicast downlink control information or the sixth-type multicast downlink control information or the eighth-type multicast downlink control information) is configured for dynamic scheduling and/or semi-persistent scheduling of the multicast traffic channel data. When the second-type multicast downlink control information (or the fifth-type multicast downlink control information or the sixth-type multicast downlink control information or the eighth-type multicast downlink control information) is configured for the dynamic scheduling and the semi-persistent scheduling and supports retransmission, the second-type multicast downlink control information (or the fifth-type multicast downlink control information or the sixth-type multicast downlink control information or the eighth-type multicast downlink control information) configured for the semi-persistent scheduling is merely configured for scheduling of a firstly-transmitted data packet; and the second-type multicast downlink control information (or the fifth-type multicast downlink control information or the sixth-type multicast downlink control information or the eighth-type multicast downlink control information) configured for the dynamic scheduling is merely configured for scheduling of a retransmitted data packet or is simultaneously configured for scheduling of the firstly-transmitted data packet and the retransmitted data packet.

In condition that one of the second-type multicast downlink control information (or the fifth-type multicast downlink control information and the sixth-type multicast downlink control information or the eighth-type multicast downlink control information) is configured for release of the semi-persistent scheduling, at least one of the following fields: the scheduling delay, the resource allocation, the modulation and coding scheme, the repetitions of the multicast data, the new data indicator (if present) and the HARQ process number (if present) in the second-type multicast downlink control information (or the fifth-type multicast downlink control information or the sixth-type multicast downlink control information or the eighth-type multicast downlink control information) is reserved for use. In condition the second-type multicast downlink control information (or the fifth-type multicast downlink control information or the sixth-type multicast downlink control information or the eighth-type multicast downlink control information) is configured for activation of the semi-persistent scheduling, at least the new data indicator (if present) and the HARQ process number (if present) in the second-type multicast downlink control information (or the fifth-type multicast downlink control information or the sixth-type multicast downlink control information or the eighth-type multicast downlink control information) are reserved for use.

In condition that the second-type multicast downlink control information (or the fifth-type multicast downlink control information or the sixth-type multicast downlink control information or the eighth-type multicast downlink control information) is configured for the dynamic scheduling and the semi-persistent scheduling of the multicast traffic channel data, the second-type multicast search space (or the fifth-type multicast search space or the sixth-type multicast search space or the eighth-type multicast search space) in which the second-type multicast downlink control information (or the fifth-type multicast downlink control information or the sixth-type multicast downlink control information or the eighth-type multicast downlink control information) configured for the semi-persistent scheduling is allowed to be detected is predefined or indicated in the multicast control channel.

In the second-type multicast search space (or the fifth-type multicast search space or the sixth-type multicast search space or the eighth-type multicast search space) in which the second-type multicast downlink control information (or the fifth-type multicast downlink control information or the sixth-type multicast downlink control information or the eighth-type multicast downlink control information) configured for the semi-persistent scheduling is allowed to be detected, the terminal device simultaneously detects the second-type multicast downlink control information (or the fifth-type multicast downlink control information or the sixth-type multicast downlink control information or the eighth-type multicast downlink control information) configured for the dynamic scheduling and the second-type multicast downlink control information (or the fifth-type multicast downlink control information or the sixth-type multicast downlink control information or the eighth-type multicast downlink control information) configured for the semi-persistent scheduling, where when one of the second-type multicast downlink control information (or the fifth-type multicast downlink control information or the sixth-type multicast downlink control information or the eighth-type multicast downlink control information) configured for the dynamic scheduling and the second-type multicast downlink control information (or the fifth-type multicast downlink control information or the sixth-type multicast downlink control information or the eighth-type multicast downlink control information) configured for the semi-persistent scheduling is successfully detected, the terminal device stops detecting the other of the second-type multicast downlink control information (or the fifth-type multicast downlink control information or the sixth-type multicast downlink control information or the eighth-type multicast downlink control information) configured for the dynamic scheduling and the second-type multicast downlink control information (or the fifth-type multicast downlink control information or the sixth-type multicast downlink control information or the eighth-type multicast downlink control information) configured for the semi-persistent scheduling.

Optionally, a radio network temporal identity (RNTI) for identifying the second-type multicast downlink control information (or the fifth-type multicast downlink control information or the sixth-type multicast downlink control information or the eighth-type multicast downlink control information) is indicated through the multicast control channel or predefined.

When the second-type multicast downlink control information (or the fifth-type multicast downlink control information or the sixth-type multicast downlink control information or the eighth-type multicast downlink control information) is configured for the dynamic scheduling and the semi-persistent scheduling of the multicast traffic channel data, the second-type multicast downlink control information (or the fifth-type multicast downlink control information or the sixth-type multicast downlink control information or the eighth-type multicast downlink control information) configured for the dynamic scheduling and the second-type multicast downlink control information (or the fifth-type multicast downlink control information or the sixth-type multicast downlink control information or the eighth-type multicast downlink control information) configured for the semi-persistent scheduling have different radio network temporal identities.

In condition that the terminal device is in a connected state and the multicast search space overlaps with (collides with) a unicast search space, the multicast search space is the first-type multicast search space, the second-type multicast search space and/or the third-type multicast search space, or the multicast search space is the fourth-type multicast search space and/or the fifth-type multicast search space, or the multicast search space is the sixth-type multicast search space and/or the seventh-type multicast search space, or the multicast search space is the eighth-type multicast search space.

The terminal device receives the multicast search space and the unicast search space in one of the manners described below.

In a manner 1, merely the unicast search space is received and the multicast search space is abandoned to be received.

In a manner 2, merely the multicast search space is received and the unicast search space is abandoned to be received.

In a manner 3, merely one of the unicast search space and the multicast search space, which appears earlier or later than the other of the unicast search space and the multicast search space, is received.

In a manner 4, the multicast search space is preferentially received, and when some conditions are met, the terminal device is allowed to continue to receive the unicast search space after receiving the multicast search space, or otherwise the unicast search space is abandoned to be received. The some conditions are as follows: the multicast search space is located before the unicast search space; the terminal device receives the multicast search space based on a specified candidate set of the multicast search space, where the specified candidate set of the multicast search space does not overlap with the unicast search space; and the terminal device has not successfully detected the multicast downlink control information, or has successfully detected the third-type multicast downlink control information (assuming that the multicast search space includes three types of multicast search spaces and the multicast search space is the third-type multicast search space) or the seventh-type multicast downlink control information (assuming that the multicast search space includes the sixth-type multicast search space and the seventh-type multicast search space, and the multicast search space is the seventh-type multicast search space) and determined that a practical candidate set for transmitting one of the third-type multicast downlink control information and the seventh-type multicast downlink control information does not overlap with the unicast search space.

In condition that the terminal device is in an idle state and the multicast search space overlaps with (collides with) the paging search space, the multicast search space is the first-type multicast search space, the second-type multicast search space and/or the third-type multicast search space, or the multicast search space is the fourth-type multicast search space and/or the fifth-type multicast search space, or the multicast search space is the sixth-type multicast search space and/or the seventh-type multicast search space, or the multicast search space is the eighth-type multicast search space.

The terminal device receives the multicast search space and the paging search space in one of the manners described below.

In a manner 1, merely the paging search space is received and the multicast search space is abandoned to be received.

In a manner 2, merely the multicast search space is received and the paging search space is abandoned to be received.

In a manner 3, merely one of the paging search space and the multicast search space, which appears earlier or later than the other of the paging search space and the multicast search space, is received.

In a manner 4, the multicast search space is preferentially received, and when some conditions are met, the terminal device is allowed to continue to receive the paging search space after receiving the multicast search space, or otherwise the paging search space is abandoned. The some conditions are as follows: the multicast search space is located before the paging search space; the terminal device receives the multicast search space based on the specified candidate set of the multicast search space, where the specified candidate set of the multicast search space does not overlap the paging search space; and the terminal device has not successfully detected the multicast downlink control information, or has successfully detected the third-type multicast downlink control information (assuming that the multicast search space includes three types of multicast search spaces and the multicast search space is the third-type multicast search space) or the seventh-type multicast downlink control information (assuming that the multicast search space includes the sixth-type multicast search space and the seventh-type multicast search space, and the multicast search space is the seventh-type multicast search space) and determined that the practical candidate set for transmitting the third-type multicast downlink control information or the seventh-type multicast downlink control information does not overlap the paging search space.

In a manner 5, one of the paging search space and the multicast search space, which appears first, is preferentially received. When the multicast search space appears first and some conditions are met, the terminal device is allowed to continue to receive the paging search space after receiving the multicast search space, or otherwise the paging search space is abandoned to be received. The some conditions are as follows: the terminal device receives the multicast search space based on the specified candidate set of the multicast search space, where the specified candidate set does not overlap with the paging search space; and the terminal device has not successfully detected the multicast downlink control information, or has successfully detected one of the third-type multicast downlink control information (assuming that the multicast search space includes three types of multicast search spaces and the multicast search space is the third-type multicast search space) and the seventh-type multicast downlink control information (assuming that the multicast search space includes the sixth-type multicast search space and the seventh-type multicast search space, and the multicast search space is the seventh-type multicast search space) and determined that the practical candidate set for transmitting one of the third-type multicast downlink control information and the seventh-type multicast downlink control information does not overlap with the paging search space.

When the paging search space appears first and some conditions are met, the terminal device is allowed to continue to receive the multicast search space after receiving the paging search space, or otherwise the multicast search space is abandoned to be received. The some conditions are as follows: the terminal device receives the paging search space based on a specified candidate set of the paging search space, where the specified candidate set does not overlap with the multicast search space; and the terminal device has not successfully detected paging downlink control information, or has successfully detected the paging downlink control information merely configured for a system information change notification purpose and determined that a practical candidate set for transmitting the paging downlink control information merely configured for the system information change notification purpose does not overlap the multicast search space. The paging downlink control information is configured for carrying scheduling information of a paging message and/or a system information change notification.

It is to be noted that the above operations are applicable to a terminal device incapable of simultaneously receiving the unicast (or paging) search space and the multicast search space. For example, the unicast (or paging) search space and the multicast search space are transmitted on different narrowbands, but the terminal device merely supports simultaneously receiving data on one narrowband. Alternatively, a larger buffer and a higher processing capability are required to simultaneously receive the unicast (or paging) search space and the multicast search space, but the terminal device cannot provide a buffer and a processing capability satisfying the above requirements. For a terminal device capable of simultaneously receiving the unicast (or paging) search space and the multicast search space, simultaneous receiving of the unicast (or paging) search space and the multicast search space will not be stopped.

In condition that the terminal device is in the connected state, within the multicast search space, the terminal device further detects unicast downlink control information. The multicast search space is the first-type multicast search space, the second-type multicast search space and/or the third-type multicast search space, or the multicast search space is the fourth-type multicast search space and/or the fifth-type multicast search space, or the multicast search space is the sixth-type multicast search space and/or the seventh-type multicast search space, or the multicast search space is the eighth-type multicast search space.

The unicast downlink control information is configured for carrying scheduling information of uplink and downlink unicast data.

The terminal device detects the unicast downlink control information in one of the following manners: the terminal device detects the unicast downlink control information according to the multicast candidate set; the terminal device detects the unicast downlink control information according to a candidate set in the unicast search space from a starting time of the multicast search space; and the terminal device detects the unicast downlink control information according to a candidate set using a specified aggregation level in the candidate set in the unicast search space from the starting time of the multicast search space.

When the terminal device detects the unicast downlink control information according to the multicast candidate set, the unicast downlink control information has a same size as the multicast downlink control information in the multicast search space.

When the terminal device is in the connected state, the multicast search space overlaps with the unicast search space, and the terminal device receives merely the multicast search space and abandons receiving the unicast search space, in condition that the multicast search space completely covers the unicast search space in time domain, the terminal device detects the unicast downlink control information based on a resource of the multicast search space from a starting time of the unicast search space, where the unicast downlink control information is detected according to the candidate set in the unicast search space or the candidate set using the specified aggregation level in the candidate set in the unicast search space.

When the multicast downlink control information supports frequency hopping, configuration of the paging downlink control information is reused by at least one of the following parameters: a frequency hopping enable flag, a number of frequency hopping narrowbands, a frequency hopping interval and a frequency hopping offset. The multicast downlink control information is the first-type multicast downlink control information, the second-type multicast downlink control information and/or the third-type multicast downlink control information when the multicast search space includes three types of multicast search spaces; or the multicast downlink control information is the fourth-type multicast downlink control information and/or the fifth-type multicast downlink control information when the multicast search space includes two types of multicast search spaces; or the multicast downlink control information is the sixth-type multicast downlink control information and/or the seventh-type multicast downlink control information when the multicast search space includes two types of multicast search spaces; or the multicast downlink control information is the eighth-type multicast downlink control information when the multicast search space includes one type of multicast search space.

Optionally, the "frequency hopping enable flag" is configured for determining whether a frequency hopping transmission mode is enabled for the multicast downlink control information; the "number of frequency hopping narrowbands" is configured for determining a number of narrowbands (for example two or four narrowbands) used for frequency hopping transmission of the multicast downlink control information; the "frequency hopping interval" is configured for determining a duration for transmitting the multicast downlink control information on a determined narrowband (for example, an integer number of subframes or radio frames); and the "frequency hopping offset" is configured for determining a frequency offset or interval between two adjacent narrowbands among all the narrowbands used for the frequency hopping transmission of the multicast downlink control information.

For the terminal device having a receiving capability within a first bandwidth, a maximum bandwidth for receiving supported by the multicast traffic channel data is one of a first bandwidth, a second bandwidth, and the first bandwidth or the second bandwidth determined via signaling. The first bandwidth is greater than the second bandwidth. It is to be noted that a range of frequency domain resources allocated or configured for transmitting the multicast traffic channel data does not exceed the maximum bandwidth for receiving supported by the multicast traffic channel data. If the multicast traffic channel data, by default, always occupies all resources within the supported maximum bandwidth for receiving, the maximum bandwidth for receiving is equivalent to a receiving bandwidth.

For example, assuming that an ordinary terminal device and a high-performance terminal device respectively have a receiving capability within 6 continuous physical resource blocks (corresponding to the second bandwidth) and a receiving capability within 25 continuous physical resource blocks (corresponding to the first bandwidth), for the high-performance terminal device, the maximum bandwidth for receiving supported by the multicast traffic channel data may be the 25 physical resource blocks or the 6 physical resource blocks, or the maximum bandwidth for receiving supported by the multicast traffic channel data is determined via the signaling to be the 25 physical resource blocks or the 6 physical resource blocks. A method of using the first bandwidth as the maximum bandwidth for receiving supported by the multicast traffic channel data helps to improve transmission efficiency of the multicast traffic channel data and reduce a transmission delay of the multicast traffic channel data. A method of using the second bandwidth as the maximum bandwidth for receiving supported by the multicast traffic channel data helps to enable the terminal device having the receiving capability within the first bandwidth and the terminal device having a receiving capability within the second bandwidth to share the same multicast traffic channel data. A method of determining the maximum bandwidth for receiving supported by the multicast traffic channel data to the first bandwidth or the second bandwidth via the signaling helps to improve scheduling flexibility of the multicast traffic channel data.

When the multicast channel data is the multicast traffic channel data, after the terminal device receives at least one multicast traffic channel data packet, the terminal device feeds back NACK information to a network side in responding to unsuccessfully decoding all of the at least one multicast traffic channel data packet. After the terminal device receives the at least one multicast traffic channel data packet, the terminal device feeds back the NACK information to the network side if the terminal device has not successfully decoded all of the at least one multicast traffic channel data packet; in this way, the network side can determine that the terminal device which has not successfully decoded all of the at least one multicast traffic channel data packet exists so that the network side can retransmit the at least one multicast traffic channel data packet in time, thereby improving transmission efficiency of the multicast traffic channel data packet.

A transmission starting time of a signal for carrying the NACK information is predefined or configured through the multicast control channel and/or the multicast downlink control information. It is to be noted that the multicast downlink control information includes the scheduling information of the multicast traffic channel data. For example, it is predefined that the signal for carrying the NACK information starts from a determined time after a transmission ending time of a last multicast traffic channel data packet in the at least one multicast traffic channel data packet. Alternatively, it is predefined that the transmission starting time of the signal for carrying the NACK information always appears periodically according to a fixed period and/or offset. Alternatively, the determined time after the transmission ending time of the last multicast traffic channel data packet in the at least one multicast traffic channel data packet when the signal for carrying the NACK information starts is configured with the multicast control channel or the multicast downlink control information. Alternatively, a period and/or offset of the transmission starting time of the signal for carrying the NACK information is configured with the multicast control channel.

Similar to the transmission starting time, a position of frequency domain resources of the signal for carrying the NACK information (for example, a position of an occupied first subcarrier) is predefined or configured with the multicast control channel and/or the multicast downlink control information; a size of the frequency domain resources of the signal for carrying the NACK information (for example, a number of occupied subcarriers) is predefined or configured with the multicast control channel and/or the multicast downlink control information; and a sequence used by the signal for carrying the NACK information is predefined (for example, a fixed sequence is used) or configured with the multicast control channel and/or the multicast downlink control information (for example, the sequence is configured as one of a preset sequence set). It is to be noted that if the signal carrying the NACK information supports the frequency hopping transmission, the size of the frequency domain resource and the position of the frequency domain resource correspond to first transmission of the signal.

A transmission duration of the signal for carrying the NACK information is predefined, or configured with the multicast control channel and/or the multicast downlink control information, or determined according to a current coverage level of the terminal device, or determined according to a maximum number of transmission repetitions in numbers of transmission repetitions used by the terminal device to successfully decode the multicast downlink control information.

For example, it is predefined that the transmission duration of the signal for carrying the NACK information is a fixed value; or a specific value of the transmission duration of the signal for carrying the NACK information is configured with the multicast control channel or the multicast downlink control information.

Alternatively, the specific value of the transmission duration of the signal for carrying the NACK information is determined according to the current coverage level of the terminal device. As an example, the terminal device may make each possible coverage level correspond to one determined value of the transmission duration. In addition, as a prior art, the terminal device can determine the current coverage level by measuring a reference signal received power (RSRP) from the network side. Optionally, in condition that the transmission duration determined according to the current coverage level of the terminal device exceeds an allowed maximum transmission duration, the transmission duration of the signal for carrying the NACK information is finally equal to the maximum transmission duration, where the allowed maximum transmission duration is predefined or configured with the multicast control channel or the multicast downlink control information.

Alternatively, the specific value of the transmission duration of the signal for carrying the NACK information is determined according to the maximum number of transmission repetitions in all the numbers of transmission repetitions corresponding to all the multicast downlink control information successfully decoded. As an example, assuming that between one time at which the terminal device feeds back the NACK information and a next time at which the terminal device feeds back the NACK information, the terminal device successfully decodes X (an integer greater than 0) pieces of multicast downlink control information based on the numbers of transmission repetitions of the X pieces of multicast downlink control information (that is, the terminal device successfully decodes a first piece of multicast downlink control information based on a number of transmission repetitions of the first piece of multicast downlink control information, successfully decodes a second piece of multicast downlink control information based on a number of transmission repetitions of the second piece of multicast downlink control information and so on until an Xth piece of multicast downlink control information is successfully decoded based on a number of transmission repetitions of the Xth piece of multicast downlink control information), the terminal device determines the specific value of the transmission duration of the signal for carrying the NACK information according to a maximum value of X numbers of transmission repetitions (for example, the terminal device make each possible maximum value correspond to one determined value of the transmission duration). Optionally, in condition that the transmission duration determined according to the maximum number of transmission repetitions in all the numbers of transmission repetitions corresponding to all the multicast downlink control information successfully decoded exceeds the allowed maximum transmission duration allowed, the transmission duration of the signal for carrying the NACK information is finally equal to the maximum transmission duration, where the allowed maximum transmission duration is predefined or configured with the multicast control channel or the multicast downlink control information.

The signal for carrying the NACK information has a preamble format. For example, for an NB-IoT system, the signal for carrying the NACK information has an NB-IoT preamble format. A minimum transmission unit of the NB-IoT preamble includes 4 groups of symbols and each of which includes 1 cyclic prefix (CP) and 5 orthogonal frequency division multiplexing (OFDM) symbols. For other systems, the signal for carrying the NACK information has preamble formats in the other systems.

It is to be noted that configuration of transmission parameters of the signal for carrying the NACK information and a principle for determining the transmission parameters of the signal for carrying the NACK information are directed to all terminal devices which receive the multicast traffic channel data. Based on the above manners, all the terminal devices which receive the multicast traffic channel data share same time-frequency and sequence resources to feed back the NACK information or share same frequency domain and sequence resources to feed back the NACK information from a same starting time. The transmission parameters include, but are not limited to, the transmission starting time, the transmission duration, the position of the frequency domain resources, the size of the frequency domain resources and the sequence.

It is to be noted that the method provided by the present disclosure may, but may not necessarily, be applied to the NB-IoT system; in addition, the method may, but may not necessarily, be applied to an Enhanced Machine Type Communication (eMTC) system.

The multicast transmission method in the optional embodiment will be further described and illustrated below according to optional examples.

Optional Example 1

For the NB-IoT system, the paging downlink control information (a format N2) includes 15 bits.

When the multicast search space includes the three types of multicast search spaces (the first-type multicast search space, the second-type multicast search space and the third-type multicast search space), a size of the first-type multicast downlink control information and a size of the second-type multicast downlink control information are the same and equal to a size of the paging downlink control information (i.e., 15 bits). In this case, the first-type multicast downlink control information and the second-type multicast downlink control information are respectively as shown in table 1 and table 2.

TABLE 1

| Field | Number of Bits |
|---|---|
| Resource allocation | 3 |
| Modulation and coding scheme | 4 |
| Repetitions of multicast data | 4 |
| Repetitions of downlink control information | 3 |
| Reserved | 1 |
| Total | 15 |

TABLE 2

| Field | Number of Bits |
| --- | --- |
| Resource allocation | 3 |
| Modulation and coding scheme | 4 |
| Repetitions of multicast data | 4 |
| Repetitions of downlink control information | 3 |
| New data indicator (reserved) | 1 |
| Total | 15 |

The field of the new data indicator is configured for supporting the retransmission of the multicast traffic channel data and indicates whether a current data packet is the firstly-transmitted data packet or the retransmitted data packet. If the retransmission of the multicast traffic channel data is not supported, the field of the new data indicator is a reserved field (in this case, the first-type multicast downlink control information is the same as the second-type multicast downlink control information).

A size of the third-type multicast downlink control information is the same as the size of the first-type/second-type multicast downlink control information. The third-type multicast downlink control information is, for example, as shown in the following table:

TABLE 3

| Field | Number of Bits |
| --- | --- |
| Multicast control channel change indication | 1 |
| Reserved | 14 |
| Total | 15 |

When the multicast search space includes the two types of multicast search spaces (the fourth-type multicast search space and the fifth-type multicast search space), a size of the fourth-type multicast downlink control information and a size of the fifth-type multicast downlink control information are the same and equal to the size of the paging downlink control information (i.e., 15 bits). In this case, the fourth-type multicast downlink control information and the fifth-type multicast downlink control information are respectively as shown in table 4 and table 5.

TABLE 4

| Field | Number of Bits |
| --- | --- |
| Resource allocation | 3 |
| Modulation and coding scheme | 4 |
| Repetitions of multicast data | 4 |
| Repetitions of downlink control information | 3 |
| Multicast control channel change notification | 1 |
| Total | 15 |

TABLE 5

| Field | Number of Bits |
| --- | --- |
| Resource allocation | 3 |
| Modulation and coding scheme | 4 |

TABLE 5-continued

| Field | Number of Bits |
| --- | --- |
| Repetitions of multicast data | 4 |
| Repetitions of downlink control information | 3 |
| New data indicator (reserved) | 1 |
| Total | 15 |

The field of the new data indicator is configured for supporting the retransmission of the multicast traffic channel data and indicates whether the current data packet is the firstly-transmitted data packet or the retransmitted data packet. If the retransmission of the multicast traffic channel data is not supported, the field of the new data indicator is the reserved field.

Optional Example 2

For the eMTC system, a number of bits included in the paging downlink control information (a format 6-2) depends on an LTE downlink system bandwidth. The number of bits specifically included in the paging downlink control information is written as:

$$\left\lceil \log_2 \left\lfloor \frac{N_{RB}^{DL}}{6} \right\rfloor \right\rceil + 10;$$

where the $N_{RB}^{DL}$ denotes a number of resource blocks (RBs) included in the LTE downlink system bandwidth. Using an example of a system bandwidth of 10 MHz, the $N_{RB}^{DL}$ is equal to 50 and a corresponding downlink control information format 6-2 includes 13 bits.

When the multicast search space includes the three types of multicast search spaces (the first-type multicast search space, the second-type multicast search space and the third-type multicast search space), a size of the first-type multicast downlink control information and a size of the second-type multicast downlink control information are the same and equal to a size of the paging downlink control information. In this case, the first-type multicast downlink control information and the second-type multicast downlink control information are respectively as shown in the table 6 and table 7.

TABLE 6

| Field | Number of Bits |
| --- | --- |
| Resource allocation | $\left\lceil \log_2 \left\lfloor \frac{N_{RB}^{DL}}{6} \right\rfloor \right\rceil$ |
| Modulation and coding scheme | 4 |
| Repetitions of multicast data | 3 |
| Repetitions of downlink control information | 2 |
| Reserved | 1 |
| Total | $\left\lceil \log_2 \left\lfloor \frac{N_{RB}^{DL}}{6} \right\rfloor \right\rceil + 10$ |

TABLE 7

| Field | Number of Bits |
|---|---|
| Resource allocation | $\left\lceil \log_2 \left\lfloor \frac{N_{RB}^{DL}}{6} \right\rfloor \right\rceil$ |
| Modulation and coding scheme | 4 |
| Repetitions of multicast data | 3 |
| Repetitions of downlink control information | 2 |
| New data indicator (reserved) | 1 |
| Total | $\left\lceil \log_2 \left\lfloor \frac{N_{RB}^{DL}}{6} \right\rfloor \right\rceil + 10$ |

The field of the new data indicator is configured for supporting the retransmission of the multicast traffic channel data and indicates whether a current data packet is the firstly-transmitted data packet or the retransmitted data packet. If the retransmission of the multicast traffic channel data is not supported, the field of the new data indicator is a reserved field (that is, the first-type multicast downlink control information is the same as the second-type multicast downlink control information).

A size of the third-type multicast downlink control information is the same as the size of the first-type/second-type multicast downlink control information. The third-type multicast downlink control information is, for example, as shown in table 8.

TABLE 8

| Field | Number of Bits |
|---|---|
| Multicast control channel change indication | 1 |
| Reserved | $\left\lceil \log_2 \left\lfloor \frac{N_{RB}^{DL}}{6} \right\rfloor \right\rceil + 9$ |
| Total | $\left\lceil \log_2 \left\lfloor \frac{N_{RB}^{DL}}{6} \right\rfloor \right\rceil + 10$ |

When the multicast search space includes the two types of multicast search spaces (the fourth-type multicast search space and the fifth-type multicast search space), a size of the fourth-type multicast downlink control information and a size of the fifth-type multicast downlink control information are the same and equal to the size of the paging downlink control information. In this case, the fourth-type multicast downlink control information and the fifth-type multicast downlink control information are respectively as shown in the table 9 and table 10.

TABLE 9

| Field | Number of Bits |
|---|---|
| Resource allocation | $\left\lceil \log_2 \left\lfloor \frac{N_{RB}^{DL}}{6} \right\rfloor \right\rceil$ |
| Modulation and coding scheme | 4 |
| Repetitions of multicast data | 3 |
| Repetitions of downlink control information | 2 |
| Multicast control channel change notification | 1 |
| Total | $\left\lceil \log_2 \left\lfloor \frac{N_{RB}^{DL}}{6} \right\rfloor \right\rceil + 10$ |

TABLE 10

| Field | Number of Bits |
|---|---|
| Resource allocation | $\left\lceil \log_2 \left\lfloor \frac{N_{RB}^{DL}}{6} \right\rfloor \right\rceil$ |
| Modulation and coding scheme | 4 |
| Repetitions of multicast data | 3 |
| Repetitions of downlink control information | 2 |
| New data indicator (reserved) | 1 |
| Total | $\left\lceil \log_2 \left\lfloor \frac{N_{RB}^{DL}}{6} \right\rfloor \right\rceil + 10$ |

The field of the new data indicator is configured for supporting the retransmission of the multicast traffic channel data and indicates whether the current data packet is the firstly-transmitted data packet or the retransmitted data packet. If the retransmission of the multicast traffic channel data is not supported, the field of the new data indicator is the reserved field.

Optional Example 3

For the NB-IoT system, a size of the search space supported by the paging search space and a corresponding candidate set are as shown in table 11.

TABLE 11

| Search Space Size | Monitored Candidate Set {Aggregation Level, Repetitions, Blind Detection Times} |
|---|---|
| 1 | {2, 1, 1} |
| 2 | {2, 1, 1}, {2, 2, 1} |
| 4 | {2, 1, 1}, {2, 2, 1}, {2, 4, 1} |
| 8 | {2, 1, 1}, {2, 2, 1}, {2, 4, 1}, {2, 8, 1} |
| 16 | {2, 1, 1}, {2, 2, 1}, {2, 4, 1}, {2, 8, 1}, {2, 16, 1} |
| 32 | {2, 1, 1}, {2, 2, 1}, {2, 4, 1}, {2, 8, 1}, {2, 16, 1}, {2, 32, 1} |
| 64 | {2, 1, 1}, {2, 2, 1}, {2, 4, 1}, {2, 8, 1}, {2, 16, 1}, {2, 32, 1}, {2, 64, 1} |
| 128 | {2, 1, 1}, {2, 2, 1}, {2, 4, 1}, {2, 8, 1}, {2, 16, 1}, {2, 32, 1}, {2, 64, 1}, {2, 128, 1} |
| 256 | {2, 1, 1}, {2, 4, 1}, {2, 8, 1}, {2, 16, 1}, {2, 32, 1}, {2, 64, 1}, {2, 128, 1}, {2, 256, 1} |
| 512 | {2, 1, 1}, {2, 4, 1}, {2, 16, 1}, {2, 32, 1}, {2, 64, 1}, {2, 128, 1}, {2, 256, 1}, {2, 512, 1} |
| 1024 | {2, 1, 1}, {2, 8, 1}, {2, 32, 1}, {2, 64, 1}, {2, 128, 1}, {2, 256, 1}, {2, 512, 1}, {2, 1024, 1} |
| 2048 | {2, 1, 1}, {2, 8, 1}, {2, 64, 1}, {2, 128, 1}, {2, 256, 1}, {2, 512, 1}, {2, 1024, 1}, {2, 2048, 1} |

When the multicast search space includes the three types of multicast search spaces (the first-type multicast search space, the second-type multicast search space and the third-type multicast search space), the first-type multicast downlink control information, the second-type multicast downlink control information and the third-type multicast downlink control information have a same size. A set of sizes of the multicast search space supported by the first-type multicast search space, the second-type multicast search space and the third-type multicast search space is the same as that of the paging search space, that is, {1, 2, 4, 8, 16, 32, 64, 128, 256, 512, 1024, 2048}.

In addition, for any size of the multicast search space, the multicast candidate set in the first-type multicast search space, the second-type multicast search space and the third-type multicast search space is the same as the candidate set in the paging search space. For example, for the first-type multicast search space, the second-type multicast search space or the third-type multicast search space when the size of the multicast search space is configured as 64, the multicast candidate set monitored by the terminal device includes {2, 1, 1}, {2, 2, 1}, {2, 4, 1}, {2, 8, 1}, {2, 16, 1}, {2, 32, 1} and {2, 64, 1}, that is, the multicast candidate set is the same as the candidate set in the paging search apace of size 64. Similar to the candidate set in the paging search space, any one multicast candidate set always starts at the beginning of the multicast search space.

When the multicast search space includes the two types of multicast search spaces (the fourth-type multicast search space and the fifth-type multicast search space), the fourth-type multicast downlink control information and the fifth-type multicast downlink control information have a same size. A set of sizes of the multicast search space supported by the fourth-type multicast search space and the fifth-type multicast search space is the same as that of the paging search space, that is, {1, 2, 4, 8, 16, 32, 64, 128, 256, 512, 1024, 2048}.

In addition, for any size of the multicast search space, the multicast candidate set in the fourth-type multicast search space and the fifth-type multicast search space is the same as the candidate set in the paging search space. For example, for the fourth-type multicast search space or the fifth-type multicast search space when the size of the multicast search space is configured as 64, the multicast candidate set monitored by the terminal device includes {2, 1, 1}, {2, 2, 1}, {2, 4, 1}, {2, 8, 1}, {2, 16, 1}, {2, 32, 1} and {2, 64, 1}, that is, the multicast candidate set is the same as the candidate set in the paging search apace of size 64. Similar to the candidate set in the paging search space, any one multicast candidate set always starts at the beginning of the multicast search space.

Optional Example 4

For the eMTC system, a size of the search space supported by the paging search space and a corresponding candidate set are as shown in table 12.

TABLE 12

| Search Space Size | Monitored Candidate Set {Aggregation Level, Repetitions, Blind Detection Times} |
| --- | --- |
| 1 | {24, 1, 1}, |
| 2 | {24, 1, 1}, {24, 2, 1} |
| 4 | {24, 1, 1}, {24, 2, 1}, {24, 4, 1} |
| 8 | {24, 1, 1}, {24, 2, 1}, {24, 4, 1}, {24, 8, 1} |
| 16 | {24, 1, 1}, {24, 4, 1}, {24, 8, 1}, {24, 16, 1} |
| 32 | {24, 1, 1}, {24, 4, 1}, {24, 16, 1}, {24, 32, 1} |

TABLE 12-continued

| Search Space Size | Monitored Candidate Set {Aggregation Level, Repetitions, Blind Detection Times} |
| --- | --- |
| 64 | {24, 2, 1}, {24, 8, 1}, {24, 32, 1}, {24, 64, 1} |
| 128 | {24, 2, 1}, {24, 16, 1}, {24, 64, 1}, {24, 128, 1} |
| 256 | {24, 2, 1}, {24, 16, 1}, {24, 64, 1}, {24, 256, 1} |

When the multicast search space includes the three types of multicast search spaces (the first-type multicast search space, the second-type multicast search space and the third-type multicast search space), the first-type multicast downlink control information, the second-type multicast downlink control information and the third-type multicast downlink control information have a same size. A set of sizes of the multicast search space supported by the first-type multicast search space, the second-type multicast search space and the third-type multicast search space is the same as that of the paging search space, that is, {1, 2, 4, 8, 16, 32, 64, 128, 256}. In addition, for any size of the multicast search space, the multicast candidate set in the first-type multicast search space, the second-type multicast search space and the third-type multicast search space is the same as the candidate set in the paging search space. For example, for the first-type multicast search space, the second-type multicast search space or the third-type multicast search space when the size of the multicast search space is configured as 64, the multicast candidate set monitored by the terminal device includes {24, 2, 1}, {24, 8, 1}, {24, 32, 1} and {24, 64, 1}, that is, the multicast candidate set is the same as the candidate set in the paging search apace of size 64. Similar to the candidate set in the paging search space, any one multicast candidate set always starts at the beginning of the multicast search space.

When the multicast search space includes the two types of multicast search spaces (the fourth-type multicast search space and the fifth-type multicast search space), the fourth-type multicast downlink control information and the fifth-type multicast downlink control information have a same size. A set of sizes of the multicast search space supported by the fourth-type multicast search space and the fifth-type multicast search space is the same as that of the paging search space, that is, {1, 2, 4, 8, 16, 32, 64, 128, 256}. In addition, for any size of the multicast search space, the multicast candidate set in the fourth-type multicast search space and the fifth-type multicast search space is the same as the candidate set in the paging search space. For example, for the fourth-type multicast search space or the fifth-type multicast search space when the size of the multicast search space is configured as 64, the multicast candidate set monitored by the terminal device includes {24, 2, 1}, {24, 8, 1}, {24, 32, 1} and {24, 64, 1}, that is, the multicast candidate set is the same as the candidate set in the paging search apace of size 64. Similar to the candidate set in the paging search space, any one multicast candidate set always starts at the beginning of the multicast search space.

Optional Example 5

For the NB-IoT system, assuming that the multicast search space includes the three types of multicast search spaces (the first-type multicast search space, the second-type multicast search space and the third-type multicast search space), the second-type multicast downlink control information is simultaneously configured for the dynamic scheduling and the semi-persistent scheduling of the multicast traffic channel data. The second-type multicast downlink control information is as shown in table 13.

TABLE 13

| Field | Number of Bits |
|---|---|
| Resource allocation | 3 |
| Modulation and coding scheme | 4 |
| Repetitions of multicast data | 4 |
| Repetitions of downlink control information | 3 |
| New data indicator | 1 |
| Total | 15 |

When the second-type multicast downlink control information is configured for the dynamic scheduling of the multicast traffic channel data, all the fields shown in table 13 are valid. When the second-type multicast downlink control information is configured for the activation of the semi-persistent scheduling of the multicast traffic channel data, the field of the new data indicator in all the fields shown in table 13 is invalid (that is, reserved or unused). When the second-type multicast downlink control information is configured for the release of the semi-persistent scheduling of the multicast traffic channel data, the fields of the scheduling delay, the resource allocation, the modulation and coding scheme, the repetitions of the multicast data and the new data indicator in all the fields shown in table 13 are invalid (that is, reserved or unused), which means that merely the field of the repetitions of the downlink control information is valid.

For the NB-IoT system, assuming that the multicast search space includes the two types of multicast search spaces (the fourth-type multicast search space and the fifth-type multicast search space), the fifth-type multicast downlink control information is simultaneously configured for the dynamic scheduling and the semi-persistent scheduling of the multicast traffic channel data. The fifth-type multicast downlink control information is as shown in table 13. When the fifth-type multicast downlink control information is configured for the dynamic scheduling of the multicast traffic channel data, all the fields shown in table 13 are valid. When the fifth-type multicast downlink control information is configured for the activation of the semi-persistent scheduling of the multicast traffic channel data, the field of the new data indicator in all the fields shown in table 13 is invalid (that is, reserved or unused). When the fifth-type multicast downlink control information is configured for the release of the semi-persistent scheduling of the multicast traffic channel data, the fields of the scheduling delay, the resource allocation, the modulation and coding scheme, the repetitions of the multicast data and the new data indicator in all the fields shown in table 13 are invalid (that is, reserved or unused), which means that merely the field of the repetitions of the downlink control information is valid.

Optional Example 6

The second-type multicast downlink control information (or the fifth-type multicast downlink control information or the sixth-type multicast downlink control information or the eighth-type multicast downlink control information) is simultaneously configured for the dynamic scheduling and the semi-persistent scheduling of the multicast traffic channel data.

Figure 4A:
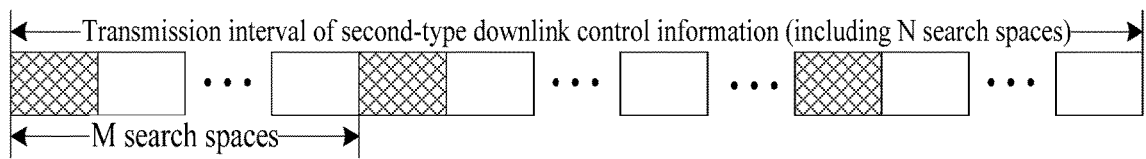
FIGS. 4A and 4B are schematic diagrams of a method for configuring a multicast search space in which downlink control information configured for semi-persistent scheduling is detected according to an optional example of the present disclosure.
Figure 4B:
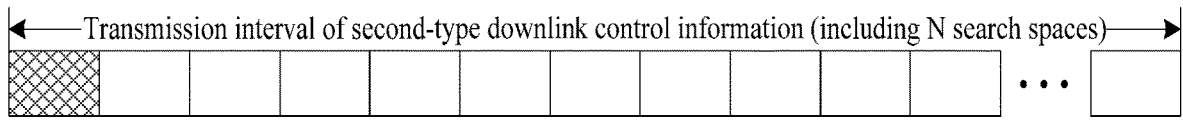

In all configured second-type multicast search spaces (or fifth-type multicast search spaces or sixth-type multicast search spaces or eighth-type multicast search spaces), the second-type multicast search space (or the fifth-type multicast search space or the sixth-type multicast search space or the eighth-type multicast search space) in which the terminal device is allowed to detect the second-type multicast downlink control information (or the fifth-type multicast downlink control information or the sixth-type multicast downlink control information or the eighth-type multicast downlink control information) configured for the semi-persistent scheduling is indicated in the multicast control channel. Taking the second-type multicast downlink control information as an example, FIGS. 4A and 4B are schematic diagrams of a method for configuring a multicast search space in which downlink control information configured for semi-persistent scheduling is detected according to an optional example of the present disclosure. As shown in FIGS. 4A and 4B, a transmission interval of the second-type multicast downlink control information includes N second-type multicast search spaces, and among every M continuous second-type multicast search spaces in the N second-type multicast search spaces, a first second-type multicast search space is configured as the second-type multicast search space in which the downlink control information configured for the semi-persistent scheduling is allowed to be detected. Alternatively, in all the configured second-type multicast search spaces, the second-type multicast search space in which the terminal device is allowed to detect the second-type multicast downlink control information configured for the semi-persistent scheduling is predefined. For example, as shown in FIG. 4B, the transmission interval of the second-type multicast downlink control information includes the N second-type multicast search spaces, and a first second-type multicast search space among the N second-type multicast search spaces is, by default, the second-type multicast search space in which the downlink control information configured for the semi-persistent scheduling is allowed to be detected. It is to be noted that in FIGS. 4A and 4B, a gray-filled square block represents the second-type multicast search space in which the downlink control information configured for the semi-persistent scheduling is not allowed to be detected, and a grid-filled square block represents the second-type multicast search space in which the downlink control information configured for the semi-persistent scheduling is allowed to be detected.

Within the second-type multicast search space in which the downlink control information configured for the semi-persistent scheduling is allowed to be detected, the terminal device simultaneously detects the second-type multicast downlink control information configured for the dynamic scheduling and the second-type multicast downlink control information configured for the semi-persistent scheduling. If the terminal device successfully detects the second-type multicast downlink control information configured for the dynamic scheduling, the terminal device stops detecting the second-type multicast downlink control information configured for the semi-persistent scheduling. On the contrary, if the terminal device successfully detects the second-type multicast downlink control information configured for the semi-persistent scheduling, the terminal device stops detecting the second-type multicast downlink control information configured for the dynamic scheduling.

Optional Example 7

Figure 5:
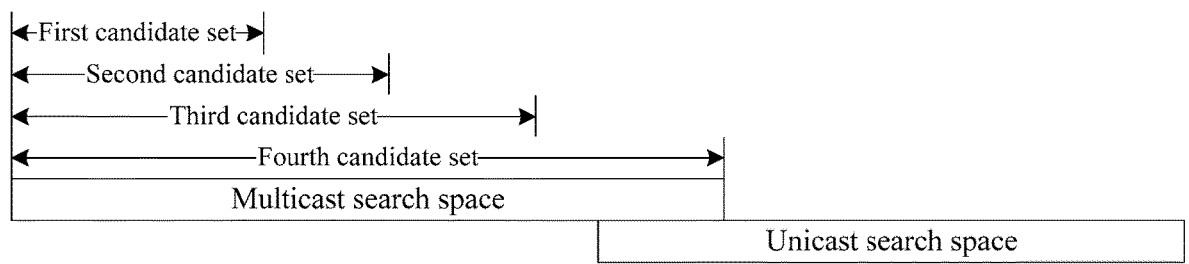
FIG. 5 is a schematic diagram of a method for receiving a multicast search space and a unicast search space according to an optional example of the present disclosure.

FIG. 5 is a schematic diagram of a method for receiving a multicast search space and a unicast search space according to an optional example of the present disclosure. As shown in FIG. 5, in the optional example, it is assumed that the terminal device is in the connected state, the multicast search space overlaps with the unicast search space, and the multicast search space is located before the unicast search space.

The terminal device receives the multicast search space according to a first candidate set and a second candidate set of the multicast search space. The first candidate set and the second candidate set of the multicast search space does not overlap with the unicast search space.

The terminal device has not successfully detected any multicast downlink control information, or has successfully detected the third-type multicast downlink control information (assuming that the multicast search space includes three types of multicast search spaces and the multicast search space is the third-type multicast search space) or the seventh-type multicast downlink control information (assuming that the multicast search space includes the sixth-type multicast search space and the seventh-type multicast search space, and the multicast search space is the seventh-type multicast search space) and determined that the practical candidate set for transmitting the third-type multicast downlink control information or the seventh-type multicast downlink control information (such as a third candidate set) does not overlap with the unicast search space. In this case, the terminal device continues to receive the unicast search space after receiving the multicast search space.

Optional Example 8

Figure 6A:
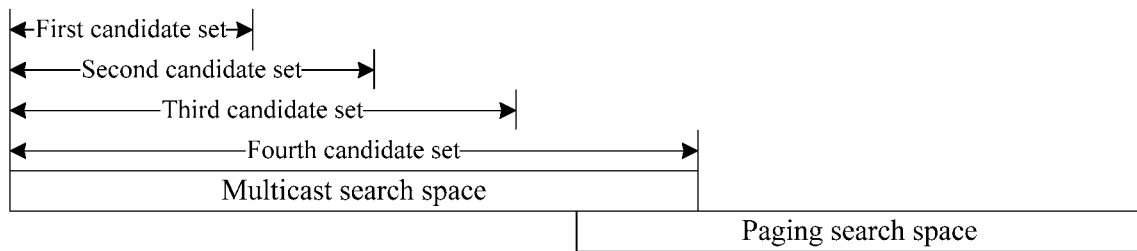
FIGS. 6A and 6B are schematic diagrams of a method for receiving a multicast search space and a paging search space according to an optional example of the present disclosure.
Figure 6B:
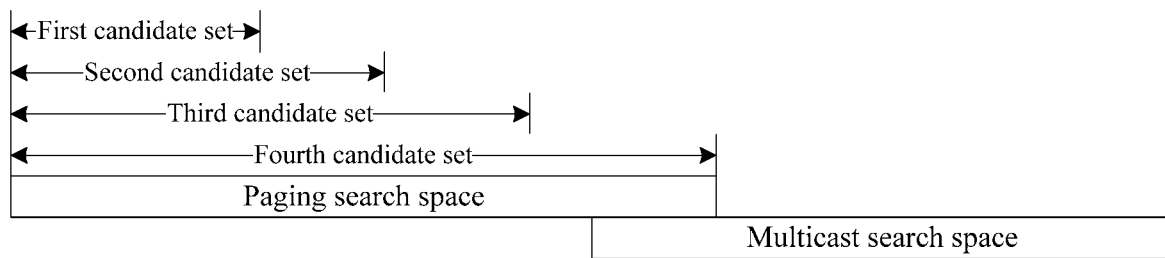

FIGS. 6A and 6B are schematic diagrams of a method for receiving a multicast search space and a paging search space according to an optional example of the present disclosure. As shown in FIGS. 6A and 6B, in the optional example, it is assumed that the terminal device is in the idle state, the multicast search space overlaps with the paging search space. It is assumed that the multicast search space is located before the paging search space, as shown in FIG. 6A.

The terminal device receives the multicast search space according to a first candidate set and a second candidate set of the multicast search space. The first candidate set and the second candidate set of the multicast search space does not overlap the paging search space.

The terminal device has not successfully detected any multicast downlink control information, or has successfully detected the third-type multicast downlink control information (assuming that the multicast search space includes three types of multicast search spaces and the multicast search space is the third-type multicast search space) or the seventh-type multicast downlink control information (assuming that the multicast search space includes the sixth-type multicast search space and the seventh-type multicast search space, and the multicast search space is the seventh-type multicast search space) and determined that the practical candidate set for transmitting the third-type multicast downlink control information or the seventh-type multicast downlink control information (such as a third candidate set) does not overlap the paging search space. In this case, the terminal device continues to receive the paging search space after receiving the multicast search space.

It is assumed that the paging search space is located before the multicast search space, as shown in FIG. 6B.

The terminal device receives the paging search space according to a first candidate set and a second candidate set of the paging search space. The first candidate and the second candidate set of the paging search space does not overlap the multicast search space.

The terminal device has not successfully detected any paging downlink control information, or has successfully detected the paging downlink control information merely configured for the system information change notification purpose and determined that the practical candidate set for transmitting the paging downlink control information merely configured for the system information change notification purpose does not overlap the multicast search space. In this case, the terminal device continues to receive the multicast search space after receiving the paging search space.

Optional Example 9

In the eMTC system, it is assumed that a number of available narrowbands is 12 and the multicast downlink control information in the multicast search space is transmitted in a frequency hopping manner. The multicast search space may be one of the first-type, second-type, third-type, fourth-type, fifth-type, sixth-type, seventh-type and eighth-type multicast search space, and the multicast downlink control information in the corresponding multicast search space may be one of the first-type, second-type, third-type, fourth-type, fifth-type, sixth-type, seventh-type and eighth-type multicast downlink control information.

Figure 7:
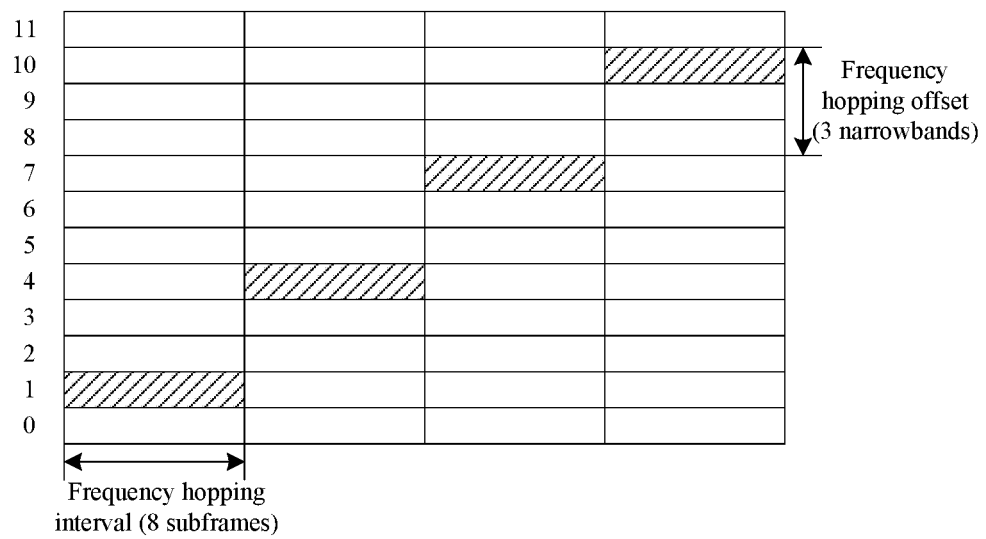
FIG. 7 is a schematic diagram 1 of a multicast transmission method according to an optional example of the present disclosure.

FIG. 7 is a schematic diagram 1 of a multicast transmission method according to an optional example of the present disclosure. Specifically, as shown in FIG. 7, 4 narrowbands are used for the frequency hopping transmission; a first narrowband used for the frequency hopping transmission is a narrowband with an index 1; a transmission duration on one narrowband (the frequency hopping interval) is 8 subframes; a frequency offset (the frequency hopping offset) between two adjacent narrowbands among all the narrowbands used for the frequency hopping transmission is 3 narrowbands; and the downlink control information is sequentially transmitted on the above 4 narrowbands in cycles with the frequency hopping interval of 8 subframes until a total transmission duration required is reached.

Optional Example 10

Taking the eMTC system as an example, it is assumed that the terminal device is in the connected state and the terminal device also needs to detect the unicast downlink control information in addition to the second-type multicast downlink control information (or the fifth-type multicast downlink control information or the sixth-type multicast downlink control information or the eighth-type multicast downlink control information) within the second-type multicast search space (or the fifth-type multicast search space or the sixth-type multicast search space or the eighth-type multicast search space). Specifically, the terminal device detects the unicast downlink control information based on a cell-radio network temporal identify (C-RNTI).

Assuming that a size Rmax,1 of the second-type multicast search space (or the fifth-type multicast search space or the sixth-type multicast search space or the eighth-type multicast search space) is 128, the multicast candidate set in the second-type multicast search space (or the fifth-type multicast search space or the sixth-type multicast search space or the eighth-type multicast search space) includes {24, 2, 1}, {24, 16, 1}, {24, 64, 1} and {24, 128, 1}. Assuming that a size Rmax,2 of the unicast search space size is 64 and the unicast search space occupies 6 physical resource blocks (PRBs) within the narrowband in frequency domain, a unicast candidate set in the unicast search space is as shown in table 14.

TABLE 14

| Set of two PRBs | {2, 8, 1}, {4, 8, 1}, {4, 16, 1}, {8, 16, 1} |
|---|---|
| Set of four PRBs | {8, 8, 2}, {16, 8, 1}, {8, 16, 2}, {16, 16, 1}, {8, 32, 1}, {16, 32, 1}, |
| Set of six PRBs | {24, 8, 1}, {24, 16, 1}, {24, 32, 1}, {24, 64, 1}, |

The terminal device detects the unicast downlink control information according to the multicast candidate set in the second-type multicast search space (or the fifth-type multicast search space or the sixth-type multicast search space or the eighth-type multicast search space), that is, sequentially detects the unicast downlink control information within 4 candidate sets {24, 2, 1}, {24, 16, 1}, {24, 64, 1} and {24, 128, 1}.

Alternatively, the terminal device detects the unicast downlink control information according to the candidate set in the unicast search space from the starting time of the second-type multicast search space (or the fifth-type multicast search space or the sixth-type multicast search space or the eighth-type multicast search space), that is, sequentially detects the unicast downlink control information within the 14 unicast candidate sets shown in table 14.

Alternatively, the terminal device detects the unicast downlink control information according to a unicast candidate set with an aggregation level 24 in the candidate set in the unicast search space from the starting time of the second-type multicast search space (or the fifth-type multicast search space or the sixth-type multicast search space or the eighth-type multicast search space), that is, sequentially detects the unicast downlink control information within 4 unicast candidate sets with the aggregation level 24 shown in table 14.

Optional Example 11

Taking the eMTC system as an example, it is assumed that the terminal device is in the connected state and the second-type multicast search space (or the fifth-type multicast search space or the sixth-type multicast search space or the eighth-type multicast search space) completely covers the unicast search space in the time domain.

Figure 8:
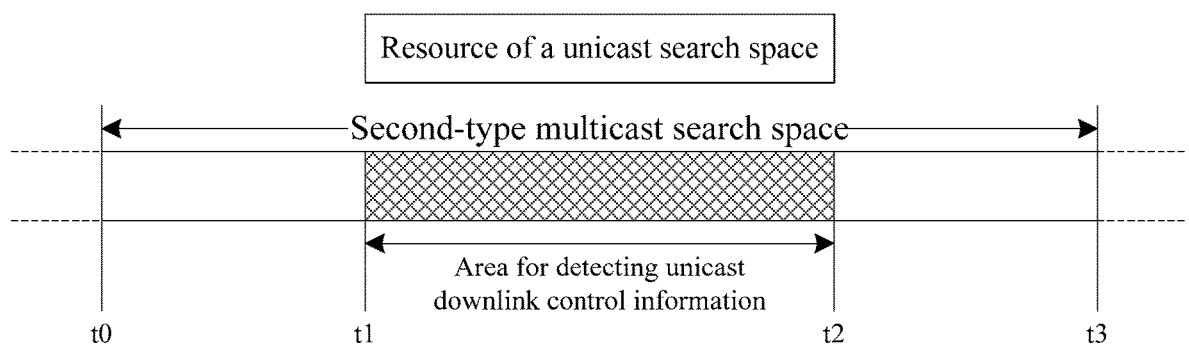
FIG. 8 is a schematic diagram 2 of a multicast transmission method according to an optional example of the present disclosure.

For example, FIG. 8 is a schematic diagram 2 of a multicast transmission method according to an optional example of the present disclosure. As shown in FIG. 8, the second-type multicast search space (or the fifth-type multicast search space or the sixth-type multicast search space or the eighth-type multicast search space) ranges from a time t0 to a time t3, and the unicast search space ranges from a time t1 to a time t2. The terminal device detects the second-type multicast downlink control information (or the fifth-type multicast downlink control information or the sixth-type multicast downlink control information or the eighth-type multicast downlink control information) within the second-type multicast search space (or the fifth-type multicast search space or the sixth-type multicast search space or the eighth-type multicast search space); in addition, the terminal device also detects the unicast downlink control information on the resource of the second-type multicast search space (or the fifth-type multicast search space or the sixth-type multicast search space or the eighth-type multicast search space) from a starting time t1 of the unicast search space. (In other words, the terminal device detects the unicast downlink control information on the resource of the second-type multicast search space (or the fifth-type multicast search space or the sixth-type multicast search space or the eighth-type multicast search space) from the starting time of the unicast search space instead of detecting the unicast downlink control information on a configured resource of the unicast search space.) Assuming that a size Rmax,2 of the unicast search space size is 64 and the unicast search space occupies 6 physical resource blocks (PRBs) within the narrowband in frequency domain, a unicast candidate set in the unicast search space is as shown in table 14. The terminal device detects the unicast downlink control information according to the candidate set in the unicast search space from the starting time t1 of the unicast search space, that is, sequentially detects the unicast downlink control information within the 14 unicast candidate sets shown in table 14. Alternatively, the terminal device detects the unicast downlink control information according to a unicast candidate set with an aggregation level 24 in the candidate set in the unicast search space from the starting time t1 of the unicast search space, that is, sequentially detects the unicast downlink control information within 4 unicast candidate sets with the aggregation level 24 shown in table 14.

Optional Example 12

Taking the eMTC system as an example, it is assumed that the terminal device is in the connected state and the terminal device also detects the unicast downlink control information in addition to the second-type multicast downlink control information (or the fifth-type multicast downlink control information or the sixth-type multicast downlink control information or the eighth-type multicast downlink control information) within the second-type multicast search space (or the fifth-type multicast search space or the sixth-type multicast search space or the eighth-type multicast search space). The terminal device detects the unicast downlink control information according to the multicast candidate set and the unicast downlink control information has a same size as the second-type multicast downlink control information.

The unicast downlink control information is as shown in table 15 (format 6-0A/0B) and table 16 (format 6-1A/1B). To reduce a size of the unicast downlink control information as much as possible, fields which originally exist in a format 6-0A/1A and not most necessary (such as the frequency hopping enable flag, a redundancy version, a power control command on a physical uplink shared channel/physical uplink control channel, an antenna port/a scrambling code identifier, a precoding information indication, a channel state information request and a sounding reference signal request) are deleted.

TABLE 15

| Field | Number of Bits (6-0A) | Number of Bits (6-0B) |
|---|---|---|
| Flag for distinguishing between format 6-0 and format 6-1 | 1 | 1 |
| Resource block allocation | $\left\lceil \log_2 \left\lfloor \frac{N_{RB}^{UL}}{6} \right\rfloor \right\rceil + 5$ | $\left\lceil \log_2 \left\lfloor \frac{N_{RB}^{UL}}{6} \right\rfloor \right\rceil + 3$ |
| Modulation and coding scheme | 4 | 4 |

TABLE 15-continued

| Field | Number of Bits (6-0A) | Number of Bits (6-0B) |
|---|---|---|
| Repetitions | 2 | 3 |
| HARQ process number | 3 | 1 |
| New data indicator | 1 | 1 |
| Uplink index | 2 | 0 |
| Downlink assignment index | 2 | 0 |
| Repetitions of downlink control information | 2 | 2 |
| Reserved field 1 | 0 | 7 |
| Reserved field 2 | $\left\lceil \log_2\left\lfloor \frac{N_{RB}^{DL}}{6} \right\rfloor \right\rceil - \left\lceil \log_2\left\lfloor \frac{N_{RB}^{UL}}{6} \right\rfloor \right\rceil$ | |
| Total | $\max\left\{ \left\lceil \log_2\left\lfloor \frac{N_{RB}^{UL}}{6} \right\rfloor \right\rceil + 22, \left\lceil \log_2\left\lfloor \frac{N_{RB}^{DL}}{6} \right\rfloor \right\rceil + 22 \right\}$ | |

TABLE 16

| Field | Number of Bits (6-1A) | Number of Bits (6-1B) |
|---|---|---|
| Flag for distinguishing between format 6-0 and format 6-1 | 1 | 1 |
| Resource block allocation | $\left\lceil \log_2\left\lfloor \frac{N_{RB}^{DL}}{6} \right\rfloor \right\rceil + 5$ | $\left\lceil \log_2\left\lfloor \frac{N_{RB}^{DL}}{6} \right\rfloor \right\rceil + 1$ |
| Modulation and coding scheme | 4 | 4 |
| Repetitions | 2 | 3 |
| HARQ process number | 3 | 1 |
| New data indicator | 1 | 1 |
| Downlink assignment index | 2 | 0 |
| HARQ-ACK resource offset | 2 | 2 |
| Repetitions of downlink control information | 2 | 2 |
| Reserved field 1 | 0 | 7 |
| Reserved field 2 | $\left\lceil \log_2\left\lfloor \frac{N_{RB}^{UL}}{6} \right\rfloor \right\rceil - \left\lceil \log_2\left\lfloor \frac{N_{RB}^{DL}}{6} \right\rfloor \right\rceil$ | |
| Total | $\max\left\{ \left\lceil \log_2\left\lfloor \frac{N_{RB}^{UL}}{6} \right\rfloor \right\rceil + 22, \left\lceil \log_2\left\lfloor \frac{N_{RB}^{DL}}{6} \right\rfloor \right\rceil + 22 \right\}$ | |

The reserved field 2 in table 15 exists when $$\left\lceil \log_2\left\lfloor \frac{N_{RB}^{DL}}{6} \right\rfloor \right\rceil - \left\lceil \log_2\left\lfloor \frac{N_{RB}^{UL}}{6} \right\rfloor \right\rceil > 0.$$

Similarly, the reserved field 2 in table 16 exists when $$\left\lceil \log_2\left\lfloor \frac{N_{RB}^{UL}}{6} \right\rfloor \right\rceil - \left\lceil \log_2\left\lfloor \frac{N_{RB}^{DL}}{6} \right\rfloor \right\rceil > 0.$$

Finally, the size of the unicast downlink control information is:

a maximum value between $$\left\lceil \log_2\left\lfloor \frac{N_{RB}^{UL}}{6} \right\rfloor \right\rceil + 22 \text{ and } \left\lceil \log_2\left\lfloor \frac{N_{RB}^{DL}}{6} \right\rfloor \right\rceil + 22.$$

The second-type multicast downlink control information (or the fifth-type multicast downlink control information or the sixth-type multicast downlink control information or the eighth-type multicast downlink control information) has the same size as the unicast downlink control information.

It is to be noted that if the size of the unicast downlink control information exceeds a size of the second-type multicast downlink control information (or the fifth-type multicast downlink control information or the sixth-type multicast downlink control information or the eighth-type multicast downlink control information) (which excludes reserved bits in the multicast downlink control information), to ensure that the size of the unicast downlink control information is the same as the size of the second-type multicast downlink control information (or the fifth-type multicast downlink control information or the sixth-type multicast downlink control information or the eighth-type multicast downlink control information), the second-type multicast downlink control information (or the fifth-type multicast downlink control information or the sixth-type multicast downlink control information or the eighth-type multicast downlink control information) needs to be filled with enough reserved bits.

Optional Example 13

Taking the NB-IoT system as an example, it is assumed that the terminal device is in the connected state and the terminal device also detects the unicast downlink control information in addition to the second-type multicast downlink control information (or the fifth-type multicast downlink control information or the sixth-type multicast downlink control information or the eighth-type multicast downlink control information) within the second-type multicast search space (or the fifth-type multicast search space or the sixth-type multicast search space or the eighth-type multicast search space). The terminal device detects the unicast downlink control information according to the multicast candidate set and the unicast downlink control information has a same size as the second-type multicast downlink control information (or the fifth-type multicast downlink control information or the sixth-type multicast downlink control information or the eighth-type multicast downlink control information).

The unicast downlink control information is as shown in table 17 (format N0) and table 18 (format N1). To reduce a size of the unicast downlink control information as much as possible, fields which originally exist in the format N0/N1 and not most necessary (such as the scheduling delay, a redundancy version and physical downlink control channel command indication) are deleted.

TABLE 17

| Field | Number of Bits |
| --- | --- |
| Flag for distinguishing between format N0 and format N1 | 1 |
| Subcarrier indication | 6 |
| Resource allocation | 3 |
| Modulation and coding scheme | 4 |
| Repetitions | 3 |
| New data indicator | 1 |
| Repetitions of downlink control information | 3 |
| Total | 21 |

TABLE 18

| Field | Number of Bits |
| --- | --- |
| Flag for distinguishing between format N0 and format N1 | 1 |
| Resource allocation | 3 |
| Modulation and coding scheme | 4 |
| Repetitions | 4 |
| New data indicator | 1 |
| HARQ-ACK resource | 4 |
| Repetitions of downlink control information | 3 |
| Reserved | 1 |
| Total | 21 |

Finally, the size of the unicast downlink control information is 21 bits.

The second-type multicast downlink control information (or the fifth-type multicast downlink control information or the sixth-type multicast downlink control information or the eighth-type multicast downlink control information) has the same size as the unicast downlink control information.

It is to be noted that if the size of the unicast downlink control information exceeds a size of the second-type multicast downlink control information (or the fifth-type multicast downlink control information or the sixth-type multicast downlink control information or the eighth-type multicast downlink control information) (which excludes reserved bits in the multicast downlink control information), to ensure that the size of the unicast downlink control information is the same as the size of the second-type multicast downlink control information (or the fifth-type multicast downlink control information or the sixth-type multicast downlink control information or the eighth-type multicast downlink control information), the second-type multicast downlink control information (or the fifth-type multicast downlink control information or the sixth-type multicast downlink control information or the eighth-type multicast downlink control information) needs to be filled with enough reserved bits.

The embodiments described above are only used to describe the technical solutions of the present disclosure and not intended to limit the technical solutions of the present disclosure. Those skilled in the art can make modifications or equivalent substitutions on the technical solutions of the present disclosure without departing from the spirit and scope of the present disclosure. The protection scope of the present disclosure is defined by the appended claims.

Embodiment 3

From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

An embodiment of the present disclosure further provides a storage medium. Optionally, in the embodiment, the storage medium may be configured to store program codes for executing the steps described below.

In S11, multicast channel data is transmitted according to a multicast search space. The multicast search space is configured for transmitting multicast downlink control information, and the multicast channel data includes at least one of multicast control channel data, multicast traffic channel data and multicast control channel change notification data.

Optionally, the storage medium is further configured to store program codes for executing the step of the method in the embodiments described above.

In S21, a first-type multicast search space and a third-type multicast search space are configured based on first configuration information carried in a multicast system information block, and a second-type multicast search space is configured based on second configuration information carried in a multicast control channel and/or the multicast system information block.

Alternatively, in S22, a fourth-type multicast search space is configured based on third configuration information carried in a multicast system information block, and a fifth-type multicast search space is configured based on fourth configuration information carried in a multicast control channel and/or the multicast system information block.

Alternatively, in S23, a seventh-type multicast search space is configured based on fifth configuration information carried in a multicast system information block, and a sixth-type multicast search space is configured based on sixth configuration information carried in a multicast control channel and/or the multicast system information block.

Alternatively, in S24, an eighth-type multicast search space is configured based on seventh configuration information carried in a multicast control channel and/or a multicast system information block.

Optionally, in the embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in the embodiment, a processor executes the steps of the method in the embodiments described above according to the program codes stored in the storage medium.

Optionally, for specific examples in the embodiment, reference may be made to the examples described in the above-mentioned embodiments and optional embodiments, and repetition will not be made herein.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

In the embodiments of the present disclosure, the multicast channel data is transmitted according to the multicast search space. The multicast search space is configured for transmitting the multicast downlink control information, and the multicast channel data includes at least one of the multicast control channel data, the multicast traffic channel data and the multicast control channel change notification data. It can be seen that the above solutions are configured for transmitting the multicast channel data such as the multicast control channel data, the multicast traffic channel data and the multicast control channel change notification data according to the multicast search space for transmitting the multicast downlink control information, thereby implementing the data transmission in the multicast manner in the NB-IoT system.

What is claimed is:

1. A multicast transmission method, comprising:
configuring, by a base station, a narrow-band multicast search space that comprises a first type of multicast search space and a second type of multicast search space, the first type of multicast search space corresponding to a first type of downlink control information comprising scheduling information of multicast control channel data and information for a multicast control channel change notification, and the second type of multicast search space corresponding to a second type of downlink control information; and
transmitting multicast channel data to a terminal according to the narrow-band multicast search space,
wherein the second type of downlink control information comprises a scheduling delay, resource allocation, a modulation and coding scheme, repetitions of the multicast data, and a Hybrid Automatic Repeat reQuest (HARQ) process number.

2. A multicast transmission apparatus, comprising:
a processor, and
a memory including processor executable code, wherein the processor executable code upon execution by the processor configures the processor to:
configure a narrow-band multicast search space that comprises a first type of multicast search space and a second type of multicast search space, the first type of multicast search space corresponding to a first type of downlink control information comprising scheduling information of multicast control channel data and information for a multicast control channel change notification, and the second type of multicast search space corresponding to a second type of downlink control information; and
transmit multicast channel data to a terminal according to the narrow-band multicast search space,
wherein the second type of downlink control information comprises a scheduling delay, resource allocation, a modulation and coding scheme, repetitions of the multicast data, and a Hybrid Automatic Repeat reQuest (HARQ) process number.

3. The method of claim 1, wherein the first type of downlink control information comprises resource allocation, a modulation and coding scheme, and repetitions of multicast data.

4. The method of claim 1, wherein the first type of multicast search space has a same set of candidates as a paging search space and wherein a number of repetitions associated with the first type of multicast search space includes {1, 2, 4, 8, 16, 32, 64, 128, 256, 512, 1024, 2048}.

5. A multicast transmission method, comprising:
receiving, by a terminal, a signaling message from a base station to configure a narrow-band multicast search space that comprises a first type of multicast search space and a second type of multicast search space, the first type of multicast search space corresponding to a first type of downlink control information comprising scheduling information of multicast control channel data and information for a multicast control channel change notification, and the second type of multicast search space corresponding to a second type of downlink control information; and
receiving, by the terminal, multicast channel data from the base station according to the narrow-band multicast search space,
wherein the second type of downlink control information comprises a scheduling delay, resource allocation, a modulation and coding scheme, repetitions of multicast data, and a Hybrid Automatic Repeat reQuest (HARQ) process number.

6. The method of claim 5, wherein the first type of downlink control information comprises resource allocation, a modulation and coding scheme, and repetitions of multicast data.

7. The method of claim 5, wherein the first type of multicast search space has a same set of candidates as a paging search space and wherein a number of repetitions associated with the first type of multicast search space includes {1, 2, 4, 8, 16, 32, 64, 128, 256, 512, 1024, 2048}.

8. The apparatus of claim 2, wherein the first type of downlink control information associated with the multicast search space comprises resource allocation, a modulation and coding scheme, and repetitions of multicast data.

9. The apparatus of claim 2, wherein the first type of multicast search space has a same set of candidates as a paging search space and wherein a number of repetitions associated with the first type of multicast search space includes {1, 2, 4, 8, 16, 32, 64, 128, 256, 512, 1024, 2048}.

10. An apparatus for multicast transmission, comprising:
a processor, and
a memory including processor executable code, wherein the processor executable code upon execution by the processor configures the processor to:
receive a signaling message from a base station to configure a narrow-band multicast search space that comprises a first type of multicast search space and a second type of multicast search space, the first type of multicast search space corresponding to a first type of downlink control information comprising scheduling information of multicast control channel data and information for a multicast control channel change notification, and the second type of multicast search space corresponding to a second type of downlink control information; and
receive multicast channel data from the base station according to the narrow-band multicast search space,
wherein the second type of downlink control information comprises a scheduling delay, resource allocation, a modulation and coding scheme, repetitions of multicast data, and a Hybrid Automatic Repeat reQuest (HARQ) process number.

11. The apparatus of claim 10, wherein the first type of downlink control information associated with the multicast search space comprises resource allocation, a modulation and coding scheme, and repetitions of multicast data.

12. The apparatus of claim 10, wherein the first type of multicast search space has a same set of candidates as a paging search space and wherein a number of repetitions associated with the first type of multicast search space includes {1, 2, 4, 8, 16, 32, 64, 128, 256, 512, 1024, 2048}.

13. A non-transitory storage medium having code stored thereon, the code upon execution by a processor, causing the processor to implement a method that comprises:
configuring, by a base station, a narrow-band multicast search space that comprises a first type of multicast search space and a second type of multicast search space, the first type of multicast search space corresponding to a first type of downlink control information comprising scheduling information of multicast control channel data and information for a multicast control channel change notification, and the second type of multicast search space corresponding to a second type of downlink control information; and
transmitting multicast channel data to a terminal according to the narrow-band multicast search space,
wherein the second type of downlink control information comprises a scheduling delay, resource allocation, a modulation and coding scheme, repetitions of the multicast data, and a Hybrid Automatic Repeat reQuest (HARQ) process number.

14. The non-transitory storage medium of claim 13, wherein the first type of downlink control information comprises resource allocation, a modulation and coding scheme, and repetitions of multicast data.

15. The non-transitory storage medium of claim 13, wherein the first type of multicast search space has a same set of candidates as a paging search space and wherein a number of repetitions associated with the first type of multicast search space includes {1, 2, 4, 8, 16, 32, 64, 128, 256, 512, 1024, 2048}.

16. A non-transitory storage medium having code stored thereon, the code upon execution by a processor, causing the processor to implement a method that comprises:
receiving, by a terminal, a signaling message from a base station to configure a narrow-band multicast search space that comprises a first type of multicast search space and a second type of multicast search space, the first type of multicast search space corresponding to a first type of downlink control information comprising scheduling information of multicast control channel data and information for a multicast control channel change notification, and the second type of multicast search space corresponding to a second type of downlink control information; and
receiving, by the terminal, multicast channel data from the base station according to narrow-band the multicast search space,
wherein the second type of downlink control information comprises a scheduling delay, resource allocation, a modulation and coding scheme, repetitions of multicast data, and a Hybrid Automatic Repeat reQuest (HARQ) process number.

17. The non-transitory storage medium of claim 16, wherein the first type of downlink control information comprises resource allocation, a modulation and coding scheme, and repetitions of multicast data.

18. The non-transitory storage medium of claim 16, wherein the first type of multicast search space has a same set of candidates as a paging search space and wherein a number of repetitions associated with the first type of multicast search space includes {1, 2, 4, 8, 16, 32, 64, 128, 256, 512, 1024, 2048}.

* * * * *